US008231454B2

(12) United States Patent
Caputo

(10) Patent No.: US 8,231,454 B2
(45) Date of Patent: Jul. 31, 2012

(54) GAMING SYSTEM AND METHOD PROVIDING A PRIMARY GAME WITH ACCUMULATED SECONDARY GAME ELEMENTS

(75) Inventor: Scott A. Caputo, Santa Clara, CA (US)

(73) Assignee: IGT, Reno, NV (US)

( * ) Notice: Subject to any disclaimer, the term of this patent is extended or adjusted under 35 U.S.C. 154(b) by 930 days.

(21) Appl. No.: 12/270,446

(22) Filed: Nov. 13, 2008

(65) Prior Publication Data

US 2010/0120514 A1 May 13, 2010

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl. ................ 463/22; 463/10; 463/11; 463/12; 463/13

(58) Field of Classification Search ............. 463/11–13, 463/22

See application file for complete search history.

(56) References Cited

U.S. PATENT DOCUMENTS

| | | | |
|---|---|---|---|
| 5,911,418 | A | 6/1999 | Adams |
| 5,961,384 | A | 10/1999 | Robinson |
| 6,135,884 | A | 10/2000 | Hedrick et al. |
| 6,270,411 | B1 | 8/2001 | Gura et al. |
| 6,315,660 | B1 | 11/2001 | DeMar et al. |
| 6,364,314 | B1 | 4/2002 | Canterbury |
| 6,461,241 | B1 | 10/2002 | Webb et al. |

(Continued)

FOREIGN PATENT DOCUMENTS

GB 2 395 439 5/2004

(Continued)

OTHER PUBLICATIONS

Bingo Game advertisement, written by Casino Data System, published in 1998.

(Continued)

*Primary Examiner* — Dmitry Suhol
*Assistant Examiner* — Kevin Y Kim
(74) *Attorney, Agent, or Firm* — Neal, Gerber & Eisenberg LLP

(57) ABSTRACT

One embodiment provides a Blackjack game where one or more players play against a dealer. The Blackjack game employs a designated set of cards, which includes one or more designated decks of cards. In addition to standard card symbols of rank and suit, each card in each designated deck of cards includes one of a plurality of secondary symbols associated with a secondary game. Each player makes a primary game wager on a play of the Blackjack game. Each player also has the option of placing an optional second wager. For each player who placed the optional second wager, if that player's hand in the play of the Blackjack game includes a designated outcome, the player accumulates one or more of the secondary symbols indicated by the cards in the player's hand. In a next play of the Blackjack game, regardless of whether that player makes the optional second wager, if any of the secondary symbols listed on the cards in the dealer's hand have a designated relationship to any of the secondary symbols that the player previously accumulated, the player wins a secondary award. The player can continue accumulating secondary symbols in each play of the Blackjack game. In certain embodiments, if the player loses a play of the Blackjack game, after any secondary awards are paid out, the player loses one, more or all of the previously accumulated secondary symbols.

38 Claims, 28 Drawing Sheets

U.S. PATENT DOCUMENTS

| | | | | |
|---|---|---|---|---|
| 6,471,210 | B1 | 10/2002 | Goldman et al. | |
| 6,482,089 | B2 | 11/2002 | DeMar et al. | |
| 6,494,785 | B1 | 12/2002 | Gerrard et al. | |
| 6,506,117 | B2 | 1/2003 | DeMar et al. | |
| 6,508,707 | B2 | 1/2003 | DeMar et al. | |
| 6,517,073 | B1 | 2/2003 | Vancura | |
| 6,520,855 | B2 | 2/2003 | DeMar et al. | |
| 6,599,193 | B2 | 7/2003 | Baerlocher et al. | |
| 6,602,136 | B1 | 8/2003 | Baerlocher et al. | |
| 6,645,073 | B2 | 11/2003 | Lemay et al. | |
| 6,645,074 | B2 | 11/2003 | Thomas et al. | |
| 6,659,461 | B2 | 12/2003 | Yoseloff et al. | |
| 6,682,419 | B2 | 1/2004 | Webb et al. | |
| 6,682,420 | B2 | 1/2004 | Webb et al. | |
| 6,685,560 | B1 | 2/2004 | Hughes | |
| 6,726,563 | B1 | 4/2004 | Baerlocher et al. | |
| 6,733,389 | B2 | 5/2004 | Webb et al. | |
| 6,749,502 | B2 | 6/2004 | Baerlocher | |
| 6,758,747 | B2 | 7/2004 | Baerlocher | |
| 6,935,955 | B1 | 8/2005 | Kaminkow et al. | |
| 6,981,917 | B2 | 1/2006 | Webb et al. | |
| 6,988,947 | B2 | 1/2006 | Baerlocher et al. | |
| 7,040,983 | B2 | 5/2006 | Dolloff et al. | |
| 7,059,965 | B2 | 6/2006 | Jackson | |
| 7,128,646 | B2 | 10/2006 | Baerlocher et al. | |
| 7,137,884 | B2 | 11/2006 | Gilmore | |
| 7,137,886 | B2 | 11/2006 | Locke et al. | |
| 7,169,046 | B2 | 1/2007 | Webb et al. | |
| 7,195,560 | B2 | 3/2007 | DeMar et al. | |
| 7,223,172 | B2 | 5/2007 | Baerlocher et al. | |
| 7,297,058 | B2 | 11/2007 | Gomez et al. | |
| 7,318,773 | B2 | 1/2008 | Baerlocher | |
| 7,329,179 | B2 | 2/2008 | Baerlocher | |
| 7,361,086 | B2 | 4/2008 | Gazdic et al. | |
| 7,371,171 | B1 | 5/2008 | Englman et al. | |
| 7,419,162 | B2 * | 9/2008 | Lancaster et al. | 273/292 |
| 7,980,933 | B2 * | 7/2011 | Kennedy | 463/12 |
| 2003/0236115 | A1 | 12/2003 | Chamberlain | |
| 2004/0171416 | A1 | 9/2004 | Baerlocher et al. | |
| 2005/0054436 | A1 | 3/2005 | Frizzell et al. | |
| 2005/0070353 | A1 | 3/2005 | Webb et al. | |
| 2005/0181860 | A1 | 8/2005 | Nguyen et al. | |
| 2005/0218591 | A1 | 10/2005 | Torigian et al. | |
| 2006/0135238 | A1 | 6/2006 | Lancaster et al. | |
| 2007/0117610 | A1 | 5/2007 | Webb et al. | |
| 2007/0135193 | A1 | 6/2007 | Nicely | |
| 2007/0167208 | A1 | 7/2007 | Acres | |
| 2007/0213119 | A1 | 9/2007 | Baerlocher et al. | |
| 2008/0020815 | A1 | 1/2008 | Lancaster et al. | |
| 2008/0064475 | A1 * | 3/2008 | Okada | 463/20 |
| 2008/0070674 | A1 | 3/2008 | Lancaster et al. | |
| 2008/0076500 | A1 | 3/2008 | Lancaster et al. | |
| 2008/0108406 | A1 | 5/2008 | Oberberger | |
| 2008/0108425 | A1 | 5/2008 | Oberberger | |

FOREIGN PATENT DOCUMENTS

| | | |
|---|---|---|
| WO | WO 2007/087156 | 8/2007 |

OTHER PUBLICATIONS

Jackpot Bingo game description, written by CDS.com, printed on Apr. 12, 2001.

Blackjack Bingo game description, written by Customized Casino Games, Ltd, available prior to Nov. 13, 2008.

Bjingo game description, written by Customized Casino Games, Ltd, available prior to Nov. 13, 2008.

Monopoly® game description, printed from http://en.wikipedia.org/wiki/Monopoly_(game) on Dec. 2, 2008, available prior to Nov. 13, 2008.

Monopoly Here and Now™ game description, written by Wager Works, printed from www.wagerworks.com/our-great-games/games-portfolio/slots.html, available Aug. 9, 2007.

* cited by examiner

FIG. 3A

100

| | Property Name | Rent Award (credits) | |
|---|---|---|---|
| 102a | First Purple Street | 1 | 104a |
| 102b | Second Purple Street | 2 | 104b |
| 102c | First Light Blue Street | 3 | 104c |
| 102d | Second Light Blue Street | 4 | 104d |
| 102e | Third Light Blue Street | 5 | 104e |
| 102f | First Pink Street | 6 | 104f |
| 102g | Second Pink Street | 7 | 104g |
| 102h | Third Pink Street | 8 | 104h |
| 102i | First Orange Street | 9 | 104i |
| 102j | Second Orange Street | 10 | 104j |
| 102k | Third Orange Street | 11 | 104k |
| 102l | First Red Street | 12 | 104l |
| 102m | Second Red Street | 13 | 104m |
| 102n | Third Red Street | 14 | 104n |
| 102o | First Yellow Street | 15 | 104o |
| 102p | Second Yellow Street | 16 | 104p |
| 102q | Third Yellow Street | 17 | 104q |
| 102r | First Green Street | 18 | 104r |
| 102s | Second Green Street | 19 | 104s |
| 102t | Third Green Street | 20 | 104t |
| 102u | First Blue Street | 21 | 104u |
| 102v | Second Blue Street | 22 | 104v |

FIG. 3B

110

| Card of Deck | Secondary Property Symbol |
|---|---|
| A ♡ | Second Purple Street |
| K ♡ | First Light Blue Street |
| Q ♡ | Second Pink Street |
| J ♡ | Third Pink Street |
| 10 ♡ | Third Light Blue Street |
| 9 ♡ | Third Orange Street |
| 8 ♡ | First Red Street |
| 7 ♡ | Second Red Street |
| 6 ♡ | Second Blue Street |
| 5 ♡ | Third Green Street |
| 4 ♡ | Third Yellow Street |
| 3 ♡ | First Green Street |
| 2 ♡ | Third Red Street |
| A ♤ | First Purple Street |
| K ♤ | Second Purple Street |
| Q ♤ | First Pink Street |
| J ♤ | First Orange Street |
| 10 ♤ | Second Light Blue Street |
| 9 ♤ | First Pink Street |
| 8 ♤ | First Orange Street |
| 7 ♤ | Third Red Street |
| 6 ♤ | First Blue Street |
| 5 ♤ | Second Yellow Street |
| 4 ♤ | Second Green Street |
| 3 ♤ | First Yellow Street |
| 2 ♤ | Third Red Street |
| A ◇ | First Purple Street |
| K ◇ | Second Light Blue Street |
| Q ◇ | Second Light Blue Street |
| J ◇ | First Pink Street |
| 10 ◇ | Third Light Blue Street |
| 9 ◇ | Third Orange Street |
| 8 ◇ | First Red Street |
| 7 ◇ | Second Red Street |
| 6 ◇ | Second Blue Street |
| 5 ◇ | Second Green Street |
| 4 ◇ | First Green Street |
| 3 ◇ | Third Yellow Street |
| 2 ◇ | First Yellow Street |
| A ♧ | First Purple Street |
| K ♧ | Third Pink Street |
| Q ♧ | First Light Blue Street |
| J ♧ | Second Purple Street |
| 10 ♧ | Second Pink Street |
| 9 ♧ | Second Orange Street |
| 8 ♧ | Third Orange Street |
| 7 ♧ | Second Red Street |
| 6 ♧ | First Blue Street |
| 5 ♧ | Second Yellow Street |
| 4 ♧ | Third Green Street |
| 3 ♧ | First Red Street |
| 2 ♧ | Second Orange Street |

GAMING SYSTEM AND METHOD PROVIDING A PRIMARY GAME WITH ACCUMULATED SECONDARY GAME ELEMENTS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and based on the amount of the wager (e.g., the higher the wager, the higher the award). Symbols or symbol combinations which are less likely to occur usually provide higher awards.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence of the secondary or bonus game (even before the player knows how much the bonus award will be). In other words, obtaining a bonus award is part of the enjoyment and excitement for players.

Many known gaming devices enable players to make one or more side bets or side wagers for each individual play of the game. The player's side bet typically provides the player a chance of obtaining a supplemental award in the play of the game, in addition to the player's existing chance of obtaining an award from their regular wager. Certain gaming devices require players to place side bets to qualify for a type of game function or game event, such as a bonus game or a bonus feature.

Some known secondary games include a group gaming aspect, wherein a plurality of players playing at linked gaming machines participate in a group event for determining one or more awards. The players playing at such gaming machines have the opportunity to participate in a shared bonus event, such as a communal bonus game provided to the players upon a triggering condition.

To increase player enjoyment and excitement with gaming devices, it is desirable to provide new and different gaming systems which provide bonus awards to players.

SUMMARY

One embodiment of the present invention relates to a gaming system, gaming device, and gaming method having a primary wagering game and a secondary game that is based on a series of plays of the primary game. In one embodiment, the gaming device enables a player to place a primary game wager to initiate a first play of the primary game. The gaming device also enables the player to place an optional, separate second wager on a secondary game. The gaming device determines a primary game outcome for the first play of the primary game and provides any awards to the player based on that primary game outcome. If the player placed the optional second wager and the primary game outcome includes a designated outcome, such as a winning outcome, the player obtains one or more secondary game elements associated with the secondary game. In one embodiment, each of the secondary game elements is a component, such as a symbol, generated in the play of the primary game. In a second subsequent play of the primary game, if the player has accumulated a designated number of (such as at least one) display a primary game operable upon a primary game wager by a player secondary game elements, regardless of whether the player makes the optional second wager or not for that second play of the primary game, the player will have an opportunity to win one or more secondary awards in addition to any awards associated with that second play of the primary game. The player's ability to win secondary awards in the second subsequent play is increased by any secondary game elements that the player has accumulated.

The gaming device determines a primary game outcome for the second play of the primary game and provides any awards to the player based on the primary game outcome. The gaming device also determines a secondary game outcome based on any secondary game elements generated in the second play of the primary game that have a designated relationship to or match any secondary game elements previously accumulated by the player. The gaming device provides any secondary awards based on the determined secondary game outcome. If the primary game outcome for the second play of the primary game includes the designated outcome and the player placed the optional second wager, the player accumulates one or more additional secondary game elements. The player can continue to accumulate secondary game elements in each play of the primary game. In certain embodiments, if the designated outcome does not occur in a play of the primary game, after any secondary awards are paid out for that play of the game, the player loses one, a plurality, or all of any previously accumulated secondary game elements.

Accordingly, by placing the optional second wager, the player gains the opportunity to win secondary awards in the secondary game in addition to the player's existing chance of winning awards in the primary game.

It should be appreciated that, in the above embodiments, when a player places the optional second wager for a play of the primary game, the second wager does not affect that play of the primary game. The average expected payback of the primary game on the player's gaming device is based on the paytable employed for that primary game and the wager associated with the primary game. The symbol combinations of the paytable, the probabilities of the symbol combinations occurring, and their respective awards determine the average expected payback for the primary game. Placing the optional second wager in addition to the primary game wager thus does not affect the paytable of the primary game.

It should also be appreciated that, in the above embodiments, accumulating secondary game elements does not provide the player with any awards nor does it impact any awards won based on the primary game outcome. Rather, the potential value of the secondary game or the probability of winning in the secondary game is increased by previously accumulated secondary game elements which have not been lost.

In one embodiment, the primary game includes a Blackjack-type game where one or more players play against a dealer. In one such embodiment, the Blackjack game employs a designated set of cards, which includes one or more designated decks of cards. In addition to standard card symbols of rank (i.e., 2 to 10, Jack, Queen, King, and Ace) and suit (i.e., clubs, spades, diamonds, and hearts), each card in each designated deck of cards includes one of a plurality of different secondary symbols or sub-symbols that are applicable in the secondary game.

Prior to the start of a first play of the Blackjack game, each player makes a wager on the Blackjack game. At the same time, each player has the option of placing an optional second wager on the secondary game. A player hand is dealt to each player and a dealer hand is dealt to the dealer. Each player may hit, stand, double down, split, and take insurance according to the house rules in a conventional manner. After each player's hand is finished, the dealer's down card is revealed and the dealer hits until the dealer's hand satisfies a predetermined condition (such as the value of the dealer's hand exceeding sixteen). Wins and losses are determined for the play of the Blackjack game in a conventional manner.

In one embodiment, for each player who placed the second optional wager, if that player's hand includes a designated outcome, such as a winning outcome, the player accumulates one or more of the secondary symbols listed on the cards in the player's winning hand. In a next play of the Blackjack game, regardless of whether that player makes the optional second wager or not for that next play, the player will have an opportunity to win one or more secondary awards in addition to any awards associated with that next play of the primary Blackjack game. More specifically, in the next play of the Blackjack game, if any of the secondary symbols listed on the cards in the dealer's hand have a designated relationship to, such as match, any of the player's accumulated secondary symbols, the player wins a secondary award for each pair or set of related secondary symbols (e.g., for each match).

In this example embodiment, the player can continue accumulating secondary symbols in each play of the Blackjack game, as long as the player's hand includes a winning outcome for that play and the player has placed the second optional wager. However, if the player loses a Blackjack game, after any secondary awards are paid out in association with that play of the Blackjack game, the player loses one, more, or all of his previously accumulated secondary symbols.

In various embodiments, a player accumulates a secondary symbol for one or more of the secondary symbols that are displayed on or indicated by: (a) the cards in the player's hand; (b) the cards in the player's hand under certain primary game conditions, such as if player's hand results in a primary game win; (c) the cards in the player's hand under certain secondary symbol rules (e.g., the player's hand must include at least two matching secondary symbols for the player to accumulate any secondary symbols); (d) the cards in the dealer's hand; (e) the cards in the dealer's hand under certain primary game conditions; (f) the cards in the dealer's hand under certain secondary symbol rules (e.g., the dealer's hand must include at least two matching secondary symbols for the player to accumulate any secondary symbols); (g) the cards of the player's hand that have a designated relationship to the cards in the dealer's hand; or (h) any other suitable condition.

It should be appreciated that, in the embodiments described above, if a player has placed the optional second wager on a particular play of the primary game, the player accumulates one or more secondary game elements (or secondary symbols) if the player obtains a winning outcome in that play of the primary game. That is, a winning outcome in the primary game is the designated outcome or condition which causes the player to accumulate one or more secondary symbols. It should be appreciated, however, that a variety of other outcomes or conditions may cause the player to obtain one or more secondary symbols. In various embodiments, the primary game conditions or outcomes can cause a player to obtain a secondary symbol include: (a) a player win in the primary game; (b) a player loss in the primary game; (c) a player-dealer tie in the primary game; (d) a player blackjack in the primary game; (e) a dealer blackjack in the primary game; (f) a dealer bust in the primary game; (g) a certain number and/or type of secondary symbols appearing in both the player's hand and the dealer's hand; and (h) any other suitable primary game outcome.

In one embodiment, the secondary game is associated with a secondary game board, such as a MONOPOLY® board, which is displayed to the player or players participating in the primary game. MONOPOLY® is a registered trademark of Hasbro, Inc. The secondary game board includes a plurality of positions, wherein each of the positions is associated with at least one of the secondary symbols listed on the cards employed in the primary game. In such an embodiment, for each secondary symbol accumulated by a player as a result of the primary game, the player obtains a marker on the position of the secondary game board which corresponds to the accumulated secondary symbol.

In one embodiment, the secondary or bonus awards are based at least in part on the value of the player's second optional wager. In one such embodiment, the amount of the optional second wager placed with the primary game wager for a play of the primary game is recorded on any markers that the player obtains on the secondary game board as a result of that primary game play. For example, if the player gains a marker on a first position on the secondary game board as a result of a play of the primary game on which the player placed an optional second wager of one credit, then the marker on that first position would say "one credit," and all secondary awards for that position would be multiplied by one. Similarly, if the player gains a marker on a second position on the secondary game board as a result of a play of the primary game on which the player placed an optional second wager of five credits, the player's marker for that second position would say "five credits," and all secondary awards for that position would be multiplied by five.

It should be appreciated that the present disclosure can be applied to any table or card game, such as blackjack, poker (including any of the numerous poker games), pai gow, roulette, baccarat, craps, alternatives thereof or any other suitable card game. In one embodiment, the present disclosure is provided in a completely live setting at a gaming table using physical cards, physical chips and a live dealer. In one such embodiment, the physical cards are tracked electronically by a card tracking mechanism configured to track the values of the cards in each player hand and the cards in the dealer hand. In other embodiments, the gaming table has virtual cards and/or virtual chips and/or a virtual dealer. In one such embodiment, the game is played at a gaming table, which includes a dealer position and one or more player positions, where each of the player positions has a display device for displaying the virtual cards dealt to the player at that player position. In another embodiment, the present disclosure is provided at an individual gaming system or device for one or more players. In certain embodiments, the present disclosure is provided through a data network such as the internet.

It should also be appreciated that the secondary game could be any type of game employing any suitable theme, such as a board game, a ladder game, or a wheel game, etc. In various alternative embodiments, the secondary game is displayed: (i) on a display device of an individual gaming machine; (ii) directly on a gaming table, such as printed on the table felt; (iii) by a shared display which is mounted in or adjacent to a gaming table; (iv) by each of a plurality of gaming devices associated with a respective player position of a gaming table; or (v) any combination of these.

It should further be appreciated that the above embodiments may be provided in single-player format or in multi-player format.

It is therefore an advantage of the present disclosure to provide a gaming system which provides players with more opportunities to win awards.

Another advantage of the present disclosure is to provide a primary game which enables a player to build equity in a secondary game based upon certain primary game events or outcomes.

A further advantage of the present disclosure is to provide a gaming system wherein, once a player acquires or builds equity in a secondary game, the player has an interest in continuing to play the primary game until an outcome for the secondary game is determined.

Additional features and advantages are described herein, and will be apparent from the following Detailed Description and the figures.

BRIEF DESCRIPTION OF THE FIGURES

FIG. 2B is a schematic diagram of the data network that one or more of the gaming devices of the present disclosure may be connected to.

FIG. 3A is a table that lists the properties of the secondary game of one example embodiment of the present disclosure and the respective rents associated with each of the properties.

FIG. 3B is a table that illustrates the mapping of a single designated deck of the cards employed in one example embodiment of the present disclosure.

DETAILED DESCRIPTION

The present disclosure may be implemented in various configurations for gaming machines, gaming devices, or gaming systems, including but not limited to: (1) a dedicated gaming machine, gaming device, or gaming systems wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
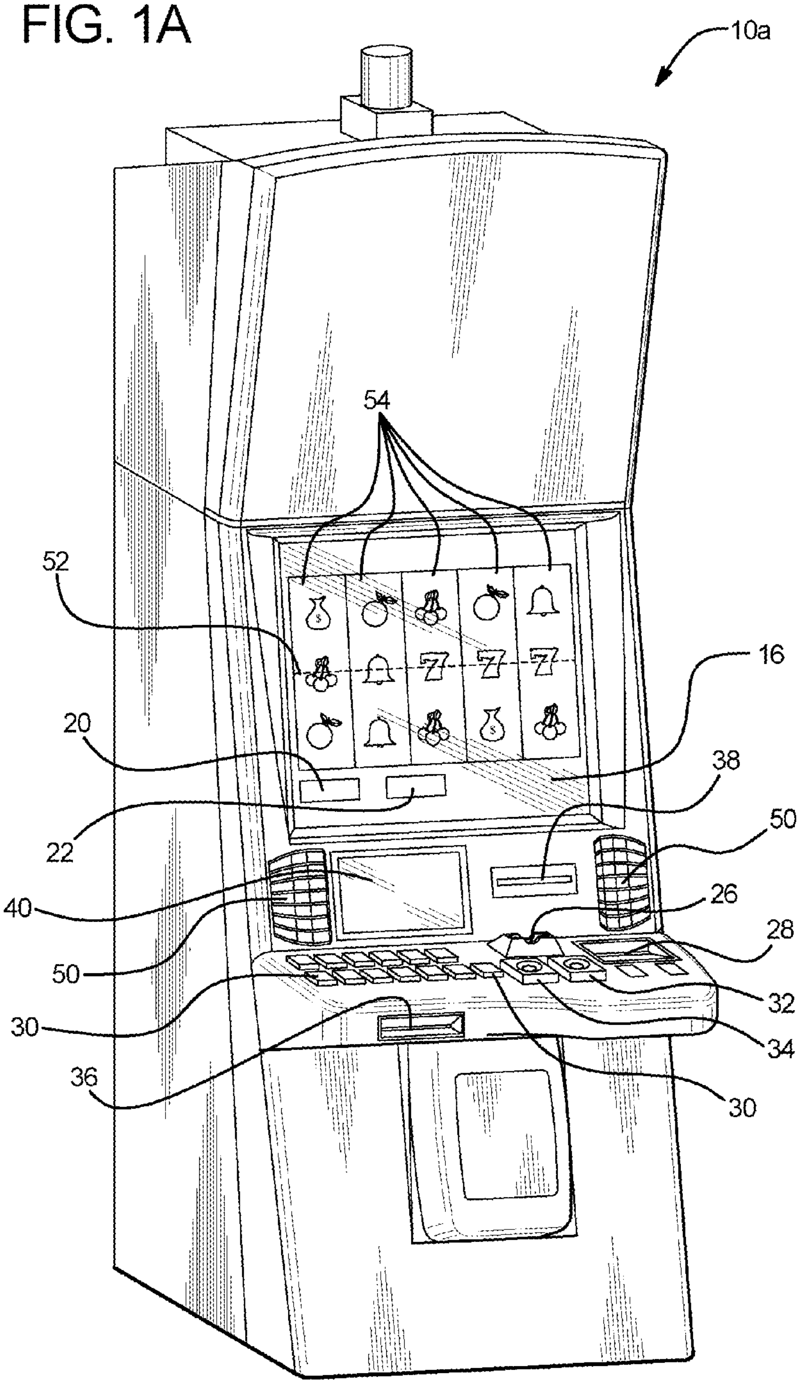
FIG. 1A is a front perspective view of one embodiment of the gaming system of the present disclosure.
Figure 1B:
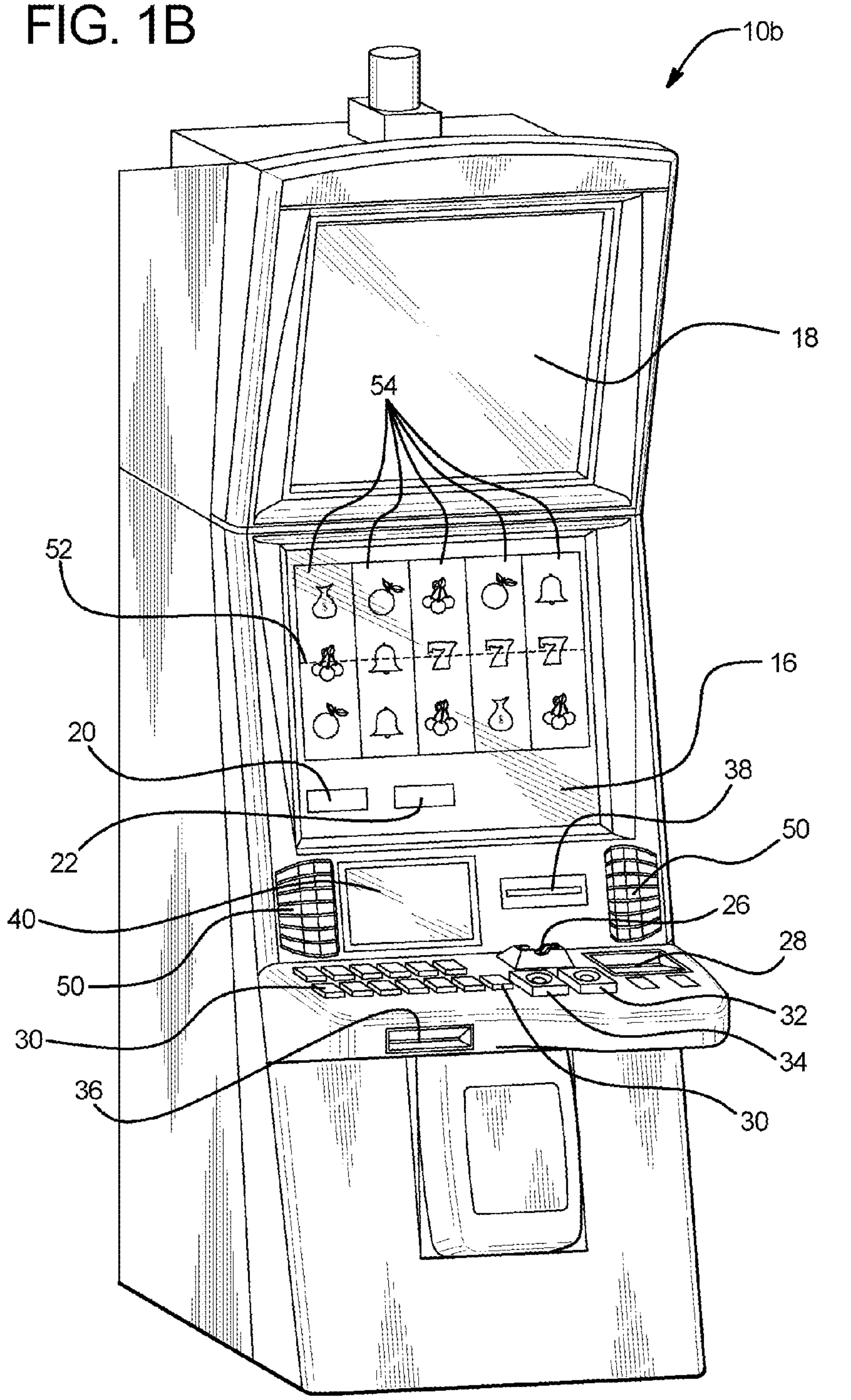
FIG. 1B is a front perspective view of one embodiment, of the gaming system of the present disclosure.

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
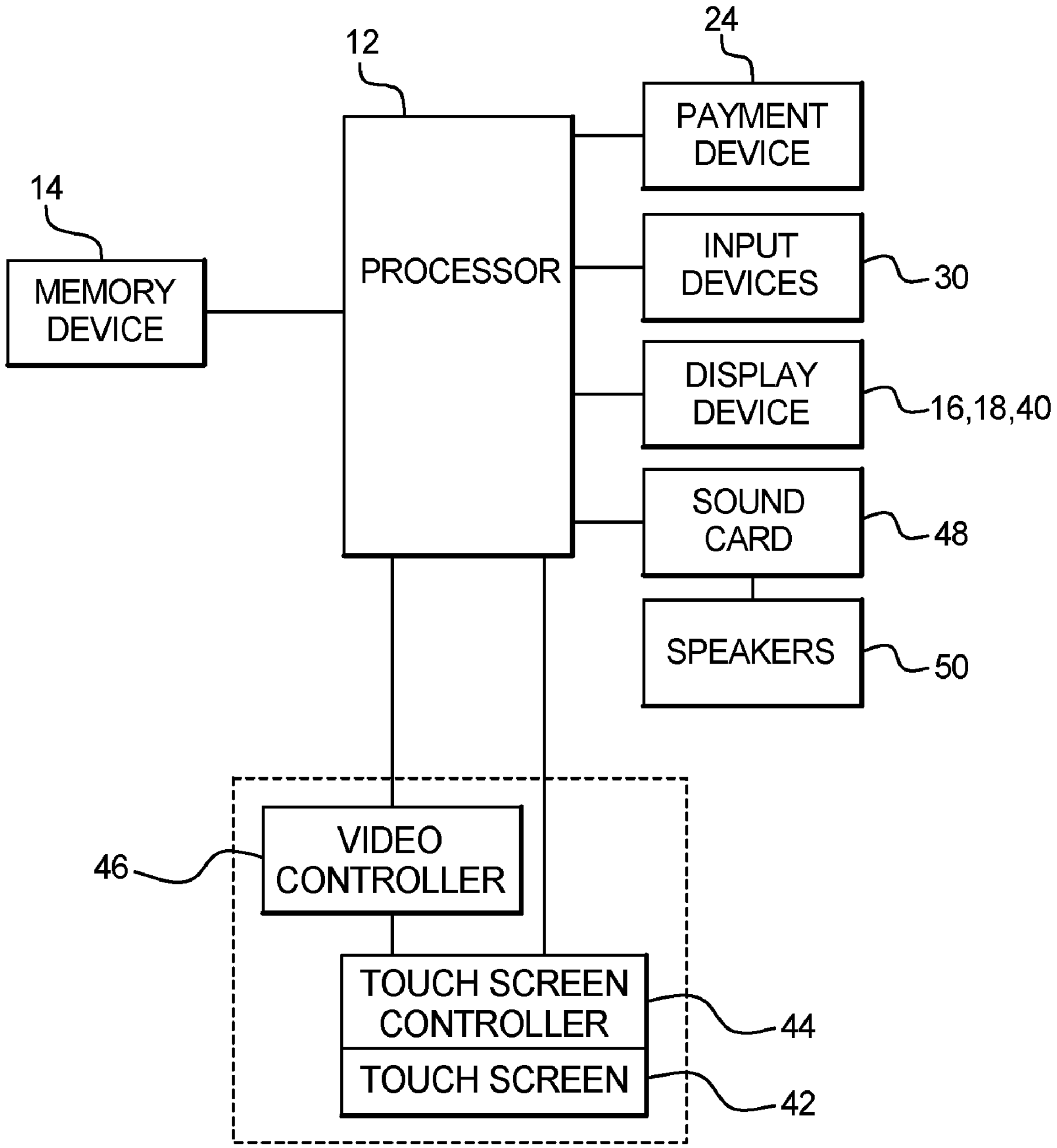
FIG. 2A is a schematic diagram of the electronic configuration of one embodiment of the gaming device of the present disclosure.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a “computer” or “controller.”

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player’s current number of credits, cash, account balance, or the equivalent. In one embodiment, the gaming device includes a bet display 22 which displays a player’s amount wagered. In one embodiment, as described in more detail below, the gaming device includes a player tracking display 40 which displays information regarding a player’s play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player’s identification, credit totals (or related data), and other relevant information. In another embodiment, a player may carry a portable device, such as a cell phone, a radio frequency identification tag, or any other suitable wireless device, which communicates a player’s identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as a primary or base game, with various embodiments of the selection game serving as a secondary or bonus game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52, with the disclosed selection game serving as a bonus game. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel). In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards, with the disclosed selection game serving as a secondary or bonus game. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, a base or primary game may be a multi-hand version of video poker, with the disclosed selection game serving as a secondary or bonus game. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices, with the disclosed selection game serving as a secondary or bonus game. In this embodiment, the player selects at least one but potentially a plurality of the selectable indicia or numbers via an input device such as a touch screen. The gaming device then displays a series of drawn numbers and determines an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
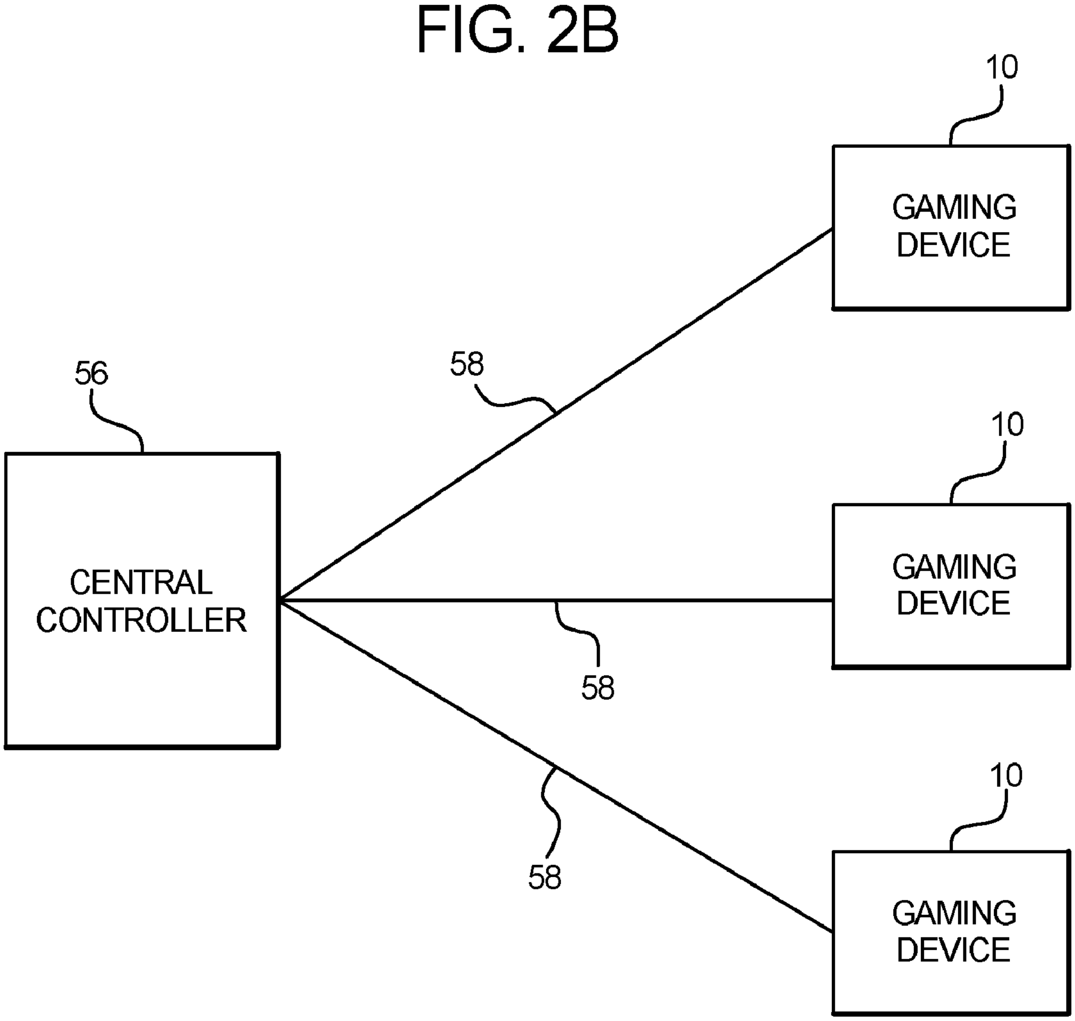

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices is in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Primary Game with Accumulated Secondary Game Elements

FIGS. 4A, 4B, 4C, 4D, 4E, 4F, 4G, 4H, 4I, 4J, 4K, 4L, 4M, 4N and 4O illustrate one single player example embodiment of the present disclosure, where the primary game includes a Blackjack game. This example embodiment is configured on a conventional type gaming machine for illustrative purposes. That is, the game is played at an individual machine or gaming console and is played by a single player. In other embodiments, the present disclosure is provided in a completely live setting at a gaming table using physical cards, physical chips and a live dealer. In one such embodiment, the physical cards are tracked electronically by a card tracking mechanism configured to track the values of the cards in each player hand and the cards in the dealer hand. In other embodiments, the gaming table has virtual cards and/or virtual chips and/or a virtual dealer. In one such embodiment, the game is played at a gaming table, which includes a dealer position and one or more player positions, where each of the player positions has a display device for displaying the virtual cards dealt to the player at that player position. In certain embodiments, the present disclosure is provided through a data network such as the internet. In some embodiments, the game of the present disclosure may be provided on home computers via a data network such as the internet.

In the illustrated embodiment, the Blackjack game employs a designated set of cards, which includes one or more designated decks of cards. In addition to standard card symbols of rank and suit, each card in each designated deck of cards includes one of a plurality of secondary symbols that relate to a secondary game. In the illustrated embodiment, the secondary game is a board game which involves acquiring and renting properties, such as the known board game MONOPOLY®, manufactured by Hasbro, Inc. MONOPOLY® is a registered trademark of Hasbro, Inc.

More specifically, each of the cards in each designated deck of cards includes a secondary property symbol which corresponds to or represents one of a plurality of properties associated with the secondary game. For example, the four of Spades has the secondary symbol associated with the "First Red St." property. FIG. 3 provides a table 100 that lists each of the properties 102*a*, 102*b*, 102*c*, . . . , 102*v* in the secondary game of this example embodiment. The table of FIG. 3 shows the respective rent award amounts 104*a*, 104*b*, 104*c*, . . . , 104*v* associated with each of the properties 102*a*, 102*b*, 102*c*, . . . , 102*v*. In one embodiment, the rent award amounts associated with the different properties vary based on a hierarchy of the properties. In this example embodiment, properties associated with higher rent awards are more valuable to the player. For example, "Second Blue St." is associated with the highest rent award, and thus provides the highest possible secondary award. On the other hand, "First Purple St." is associated with the lowest rent award. It should be appreciated, however, that the rent awards associated with the different properties can be determined in any suitable manner.

In FIG. 3B, the table 110 illustrates an example of a designated deck of cards employed in the Blackjack game. Specifically, FIG. 3B illustrates how the different properties are distributed on the cards of a single designated deck. In one embodiment, there are fewer properties than the number of cards in a deck of cards, so certain properties many appear on multiple cards of a single deck. As seen in the illustrated example deck, certain of the properties appear on multiple cards of the deck. In one embodiment, the more valuable properties are listed on fewer of the cards. In the illustrated example deck, the more valuable properties are listed on cards that are least likely to be part of a winning blackjack hand (e.g., cards having values of two, three, four, five, and six). That is, the value of a card and property listed on that card is inversely related. For example, a player might be much less likely to win a Blackjack game with a 6♥ card, so the most valuable property of all the properties (i.e., "Second Blue Street") is listed on the 6♥ card. The cards with higher values, such as aces, face cards, and tens, are associated with the less valuable properties. For example, "Second Blue St." 104*v* (i.e., the most valuable property of the secondary game, according to the table provided in FIG. 3A) is listed on the 6♥ card because a player is less likely to win a Blackjack game with the 6♥ card. In other embodiments, the value of a card and property listed on that card is not inversely related. In one embodiment, which property (or properties) is associated with each card is randomly determined. In one such embodiment, a card may be randomly determined to have zero, one, or more properties associated with it. In another embodiment, the identity of the property on each card is hidden from the player until after the play of the primary game is resolved. In this embodiment, once the play of the primary game is resolved, the property associated with each card in the player's hand of cards is revealed to the player.

In one embodiment, the Blackjack game of the present disclosure uses one to six decks of cards. In one embodiment, each deck of cards used in the Blackjack game has the same mapping of properties on the cards. In other embodiments, each or a plurality of the decks of cards used in the Blackjack game have a different mapping of properties.

Figure 4A:
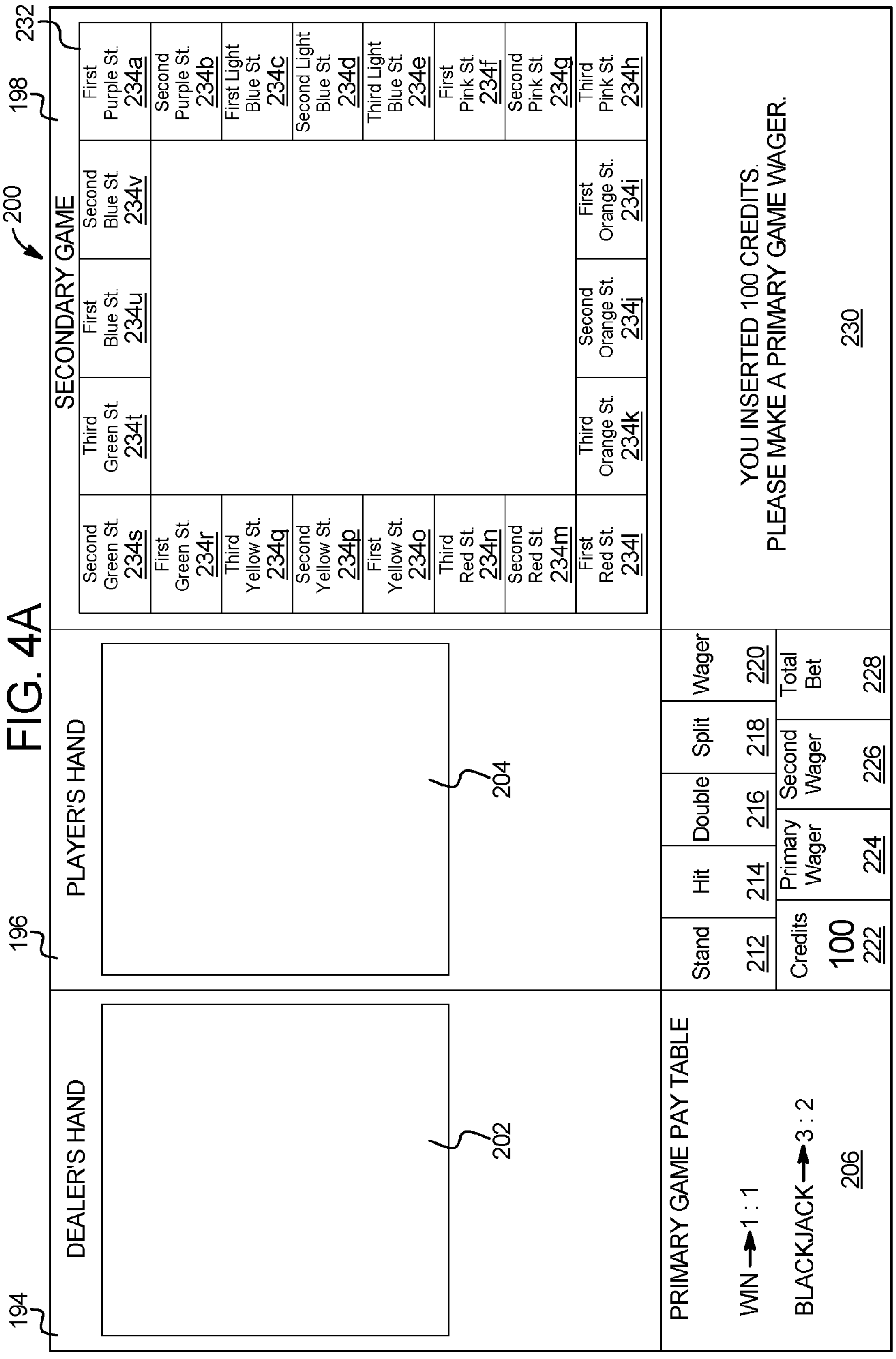
FIGS. 4A, 4B, 4C, 4D, 4E, 4F, 4G, 4H, 4I, 4J, 4K, 4L, 4M, 4N and 4O are illustrations of screen displays for an example round of play of the game according to one single player embodiment of the present disclosure.
Figure 4B:
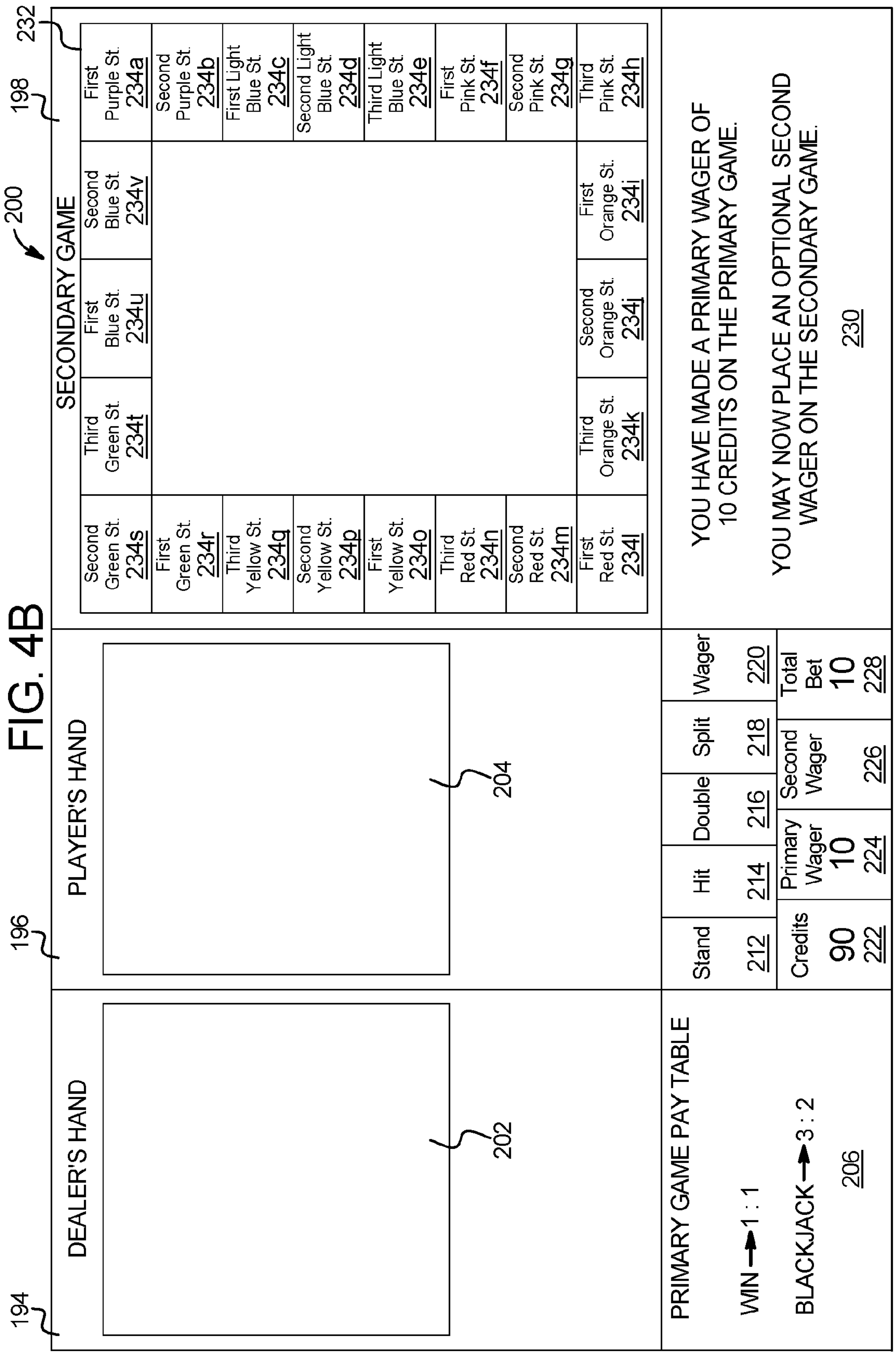
Figure 4C:
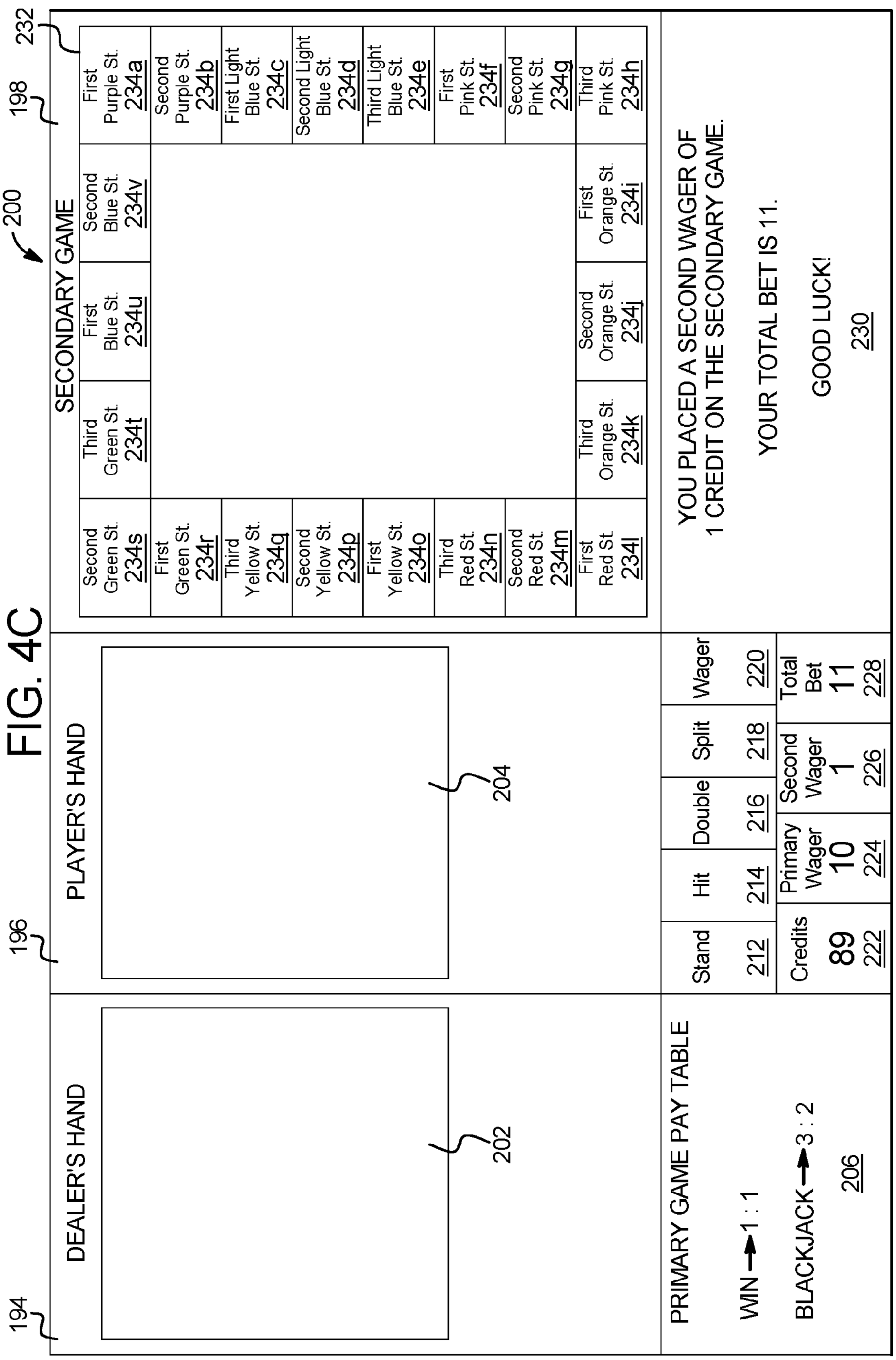
Figure 4D:
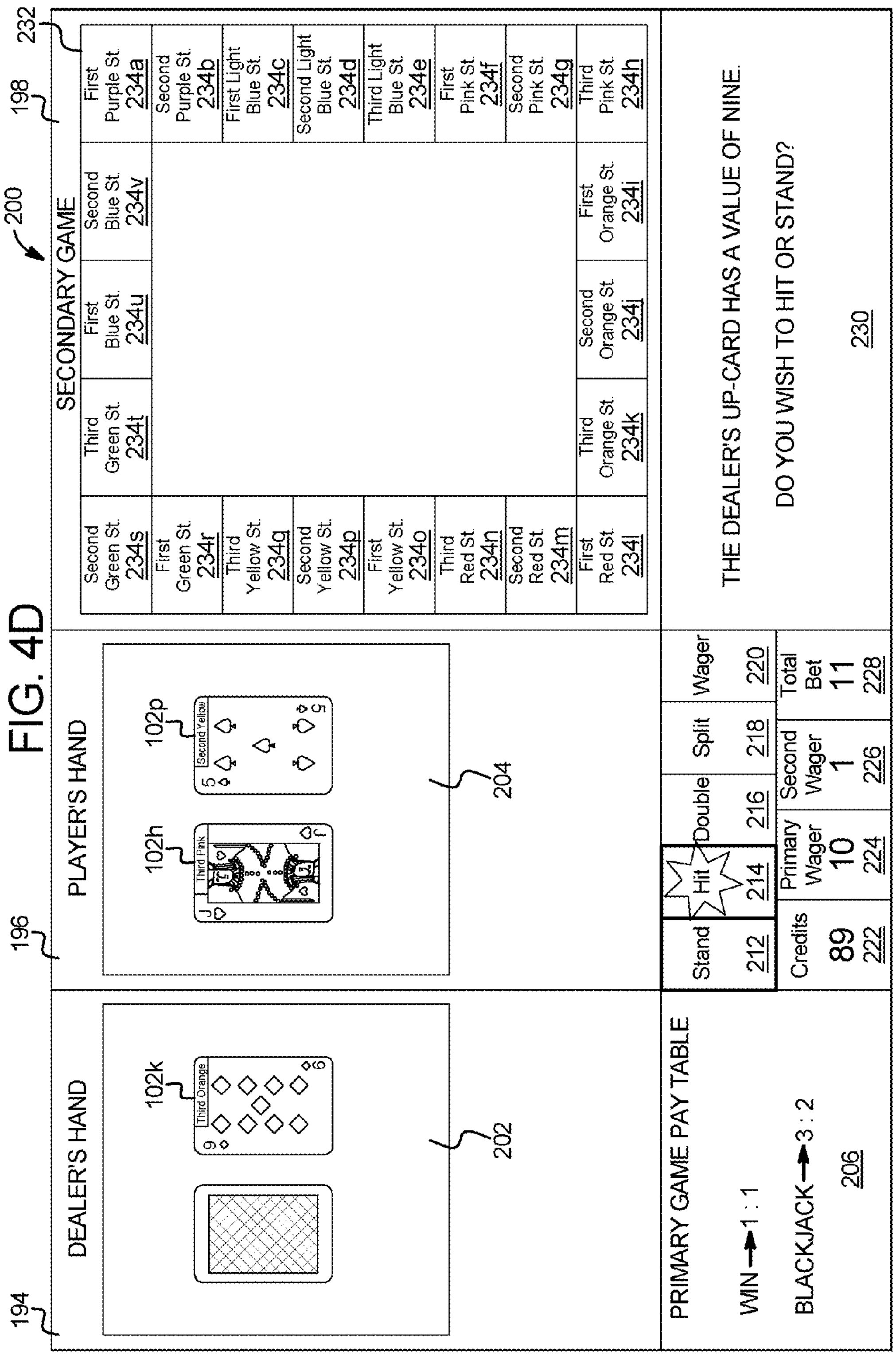
Figure 4E:
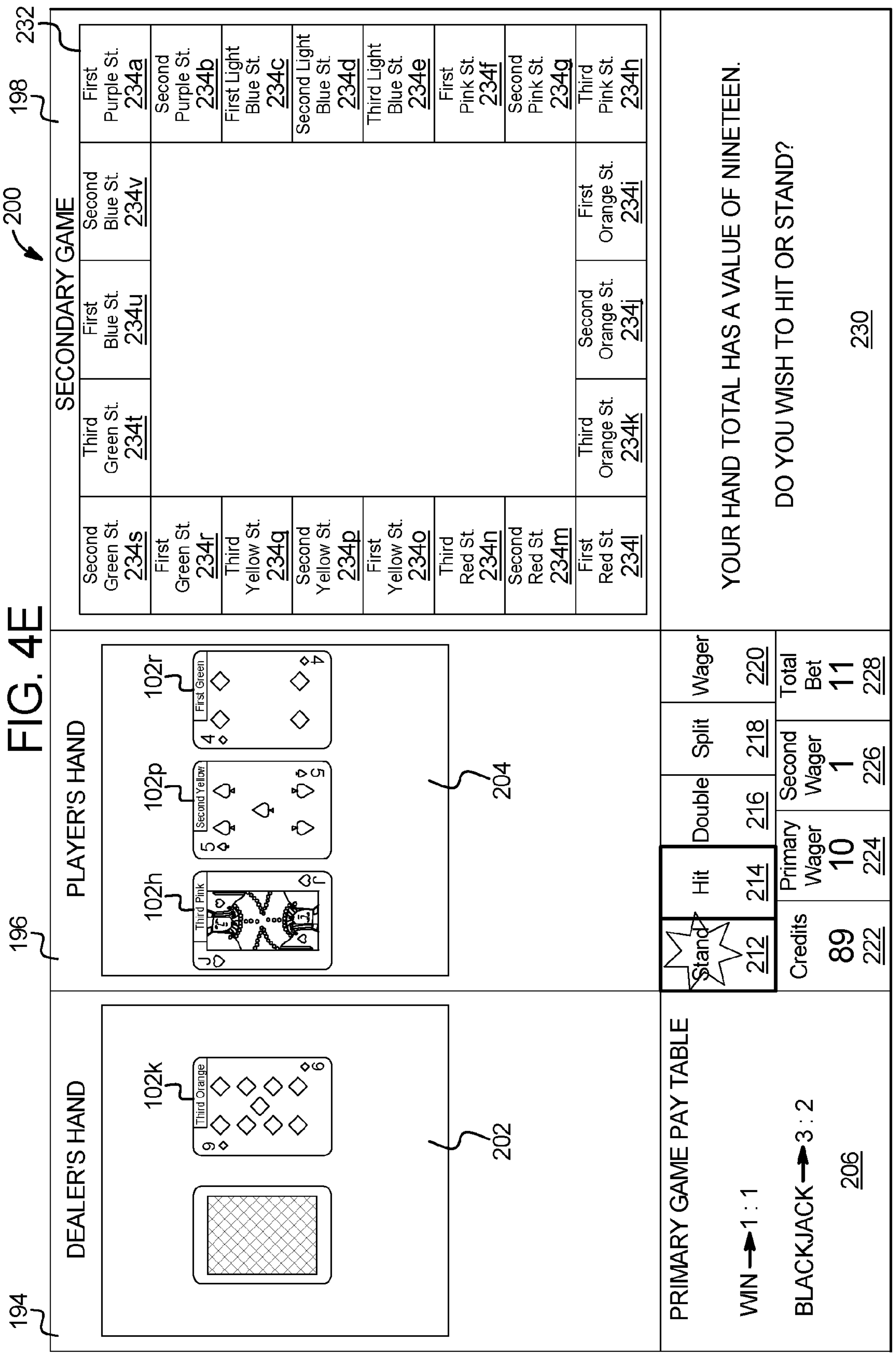
Figure 4F:
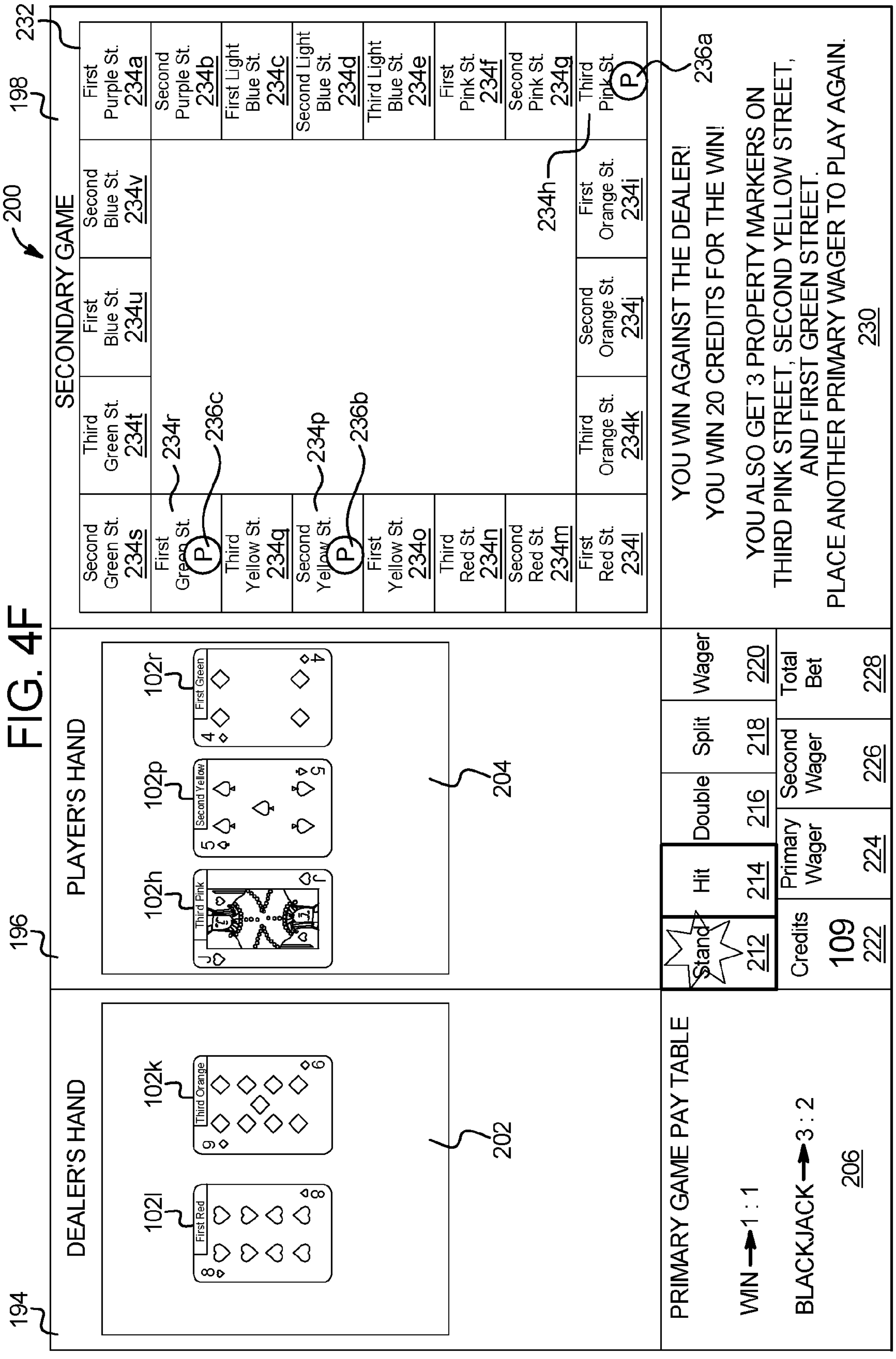
Figure 4G:
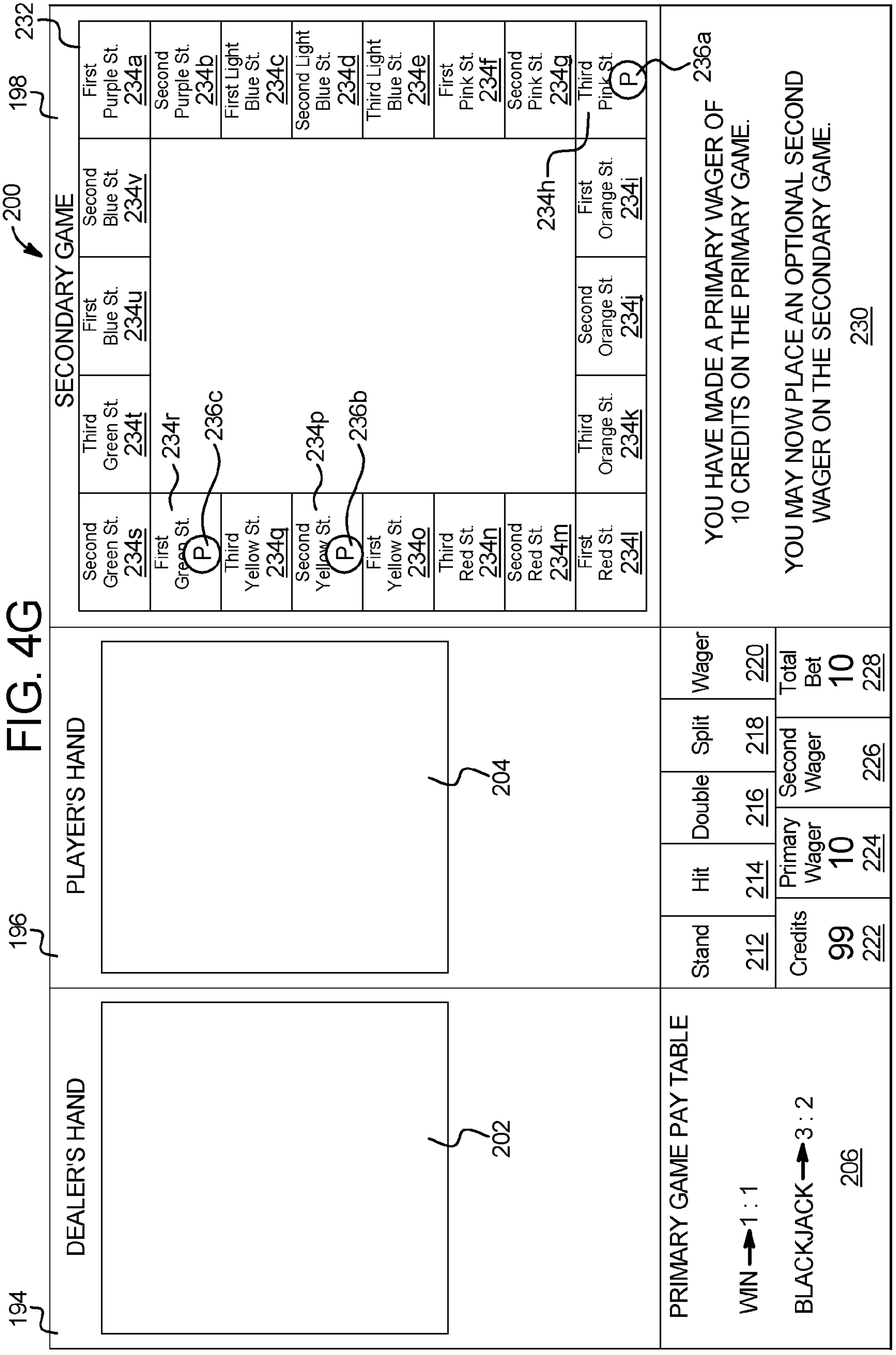
Figure 4H:
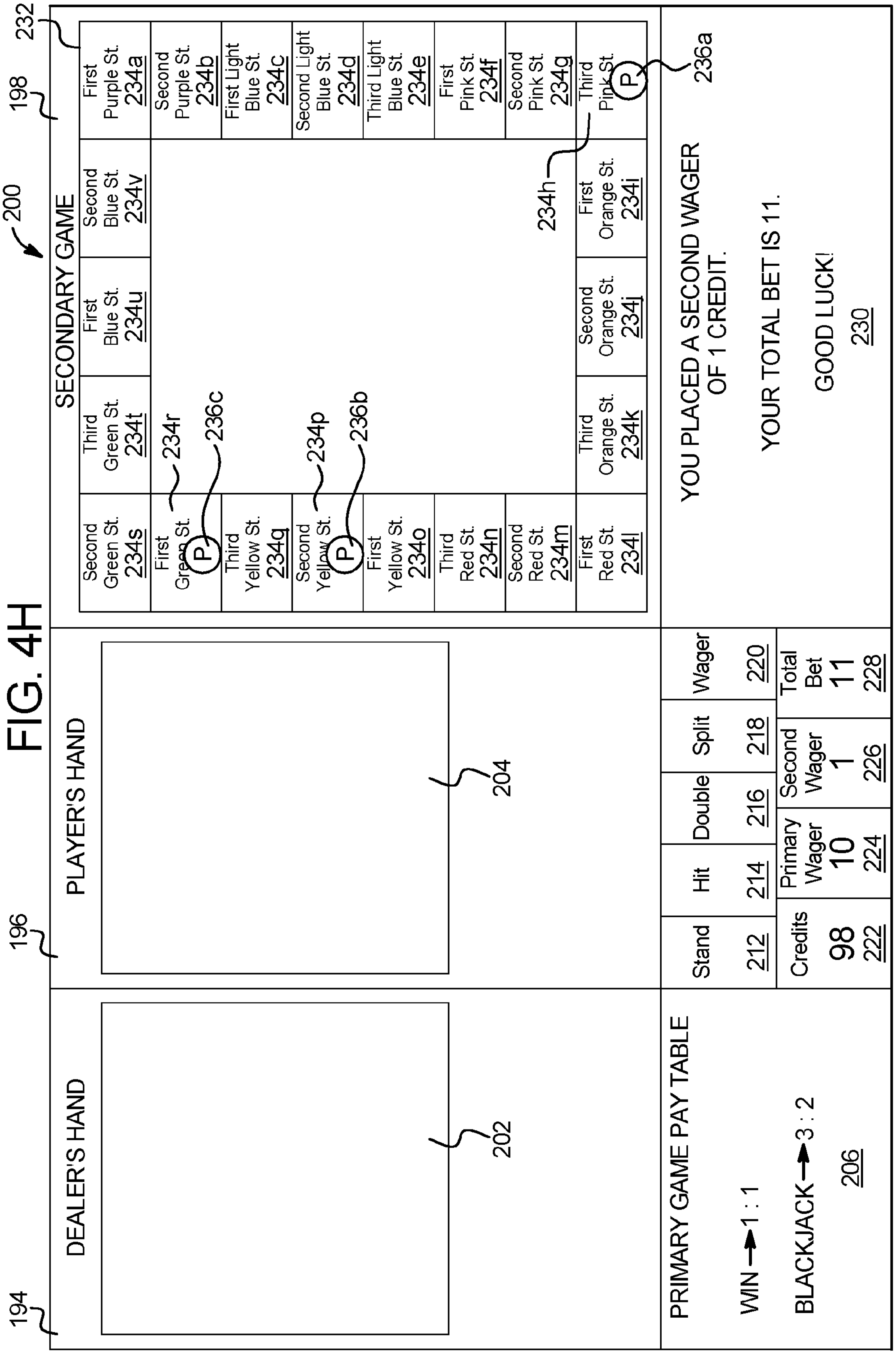
Figure 4I:
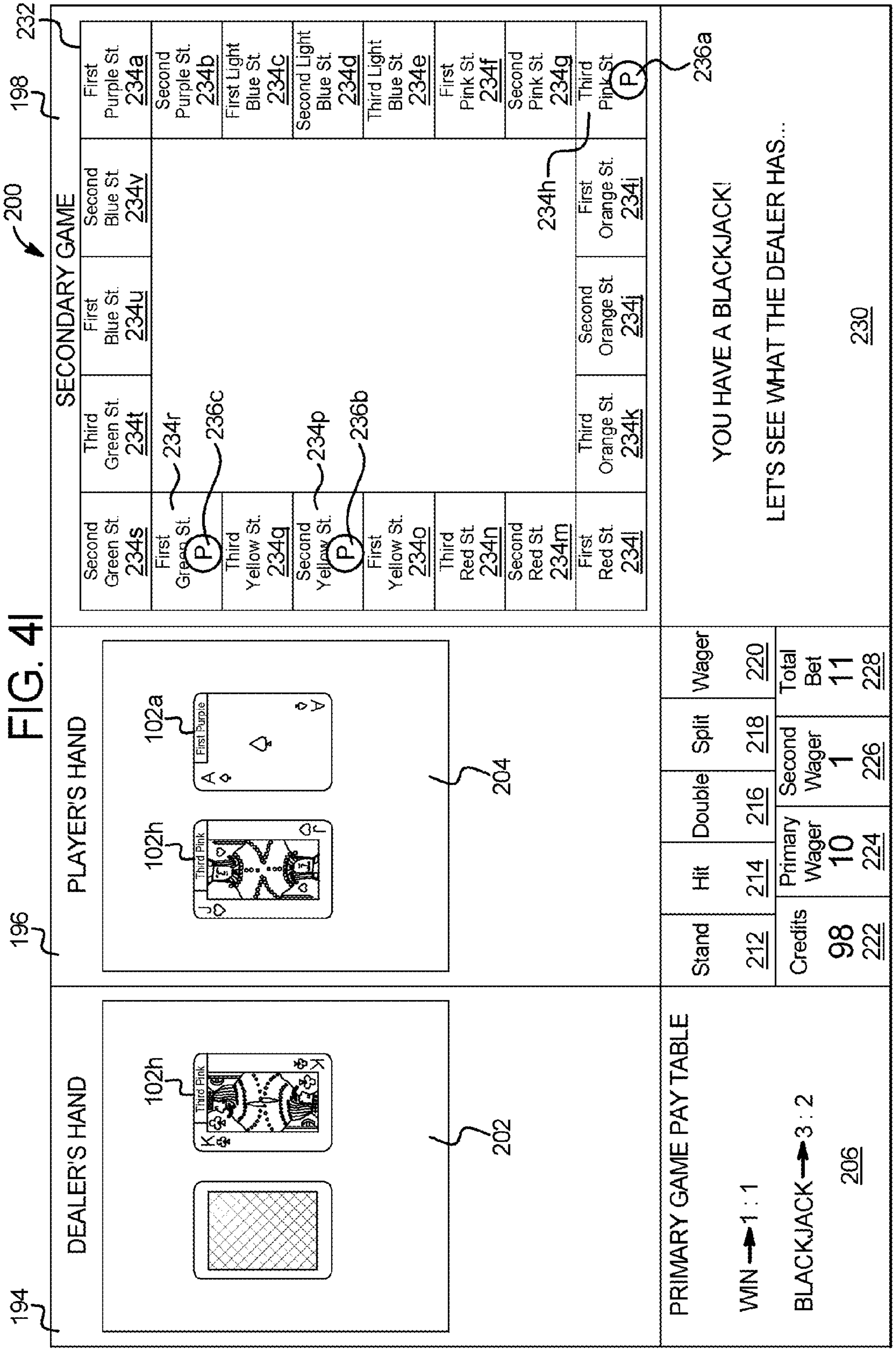
Figure 4J:
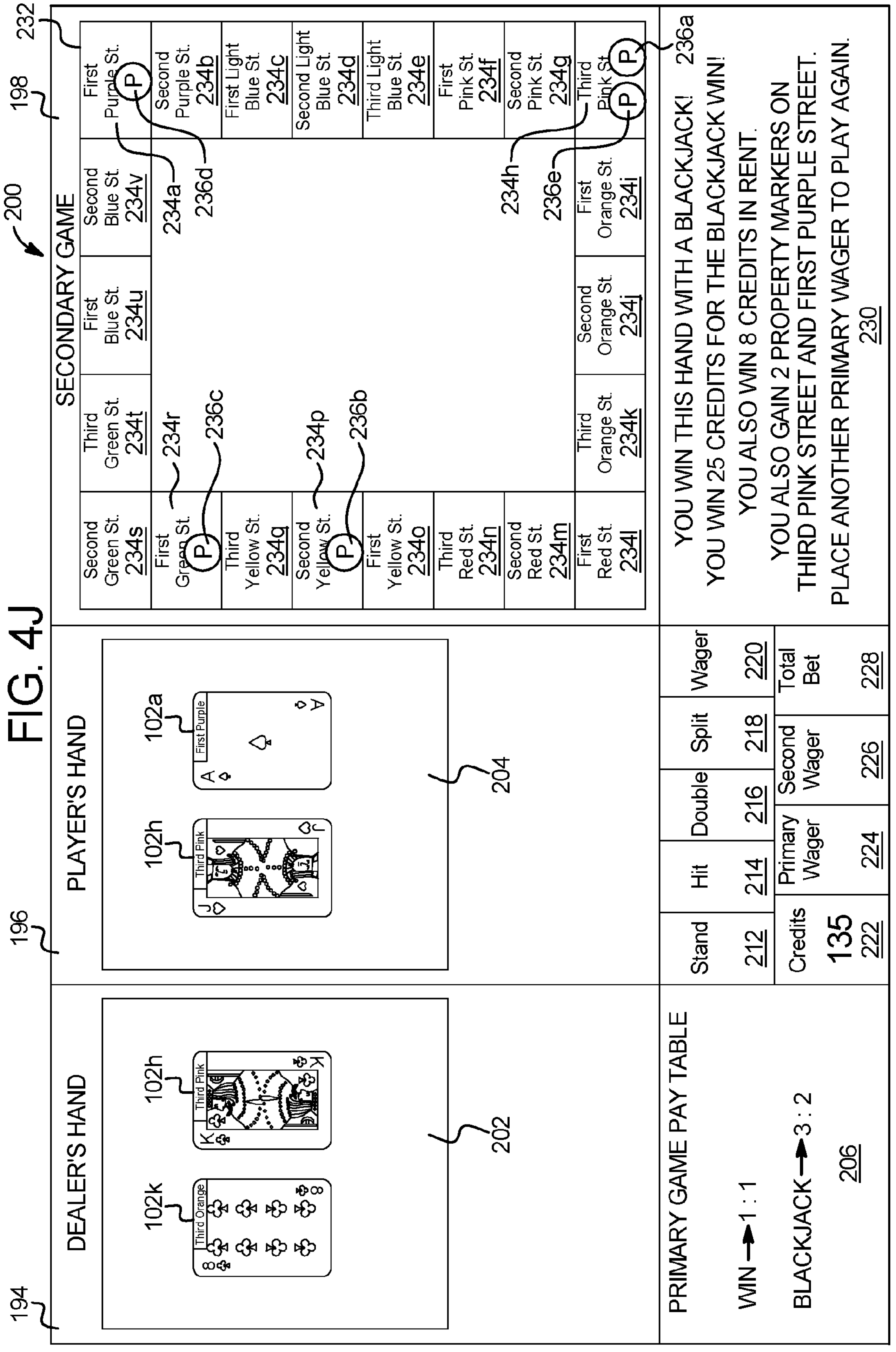
Figure 4K:
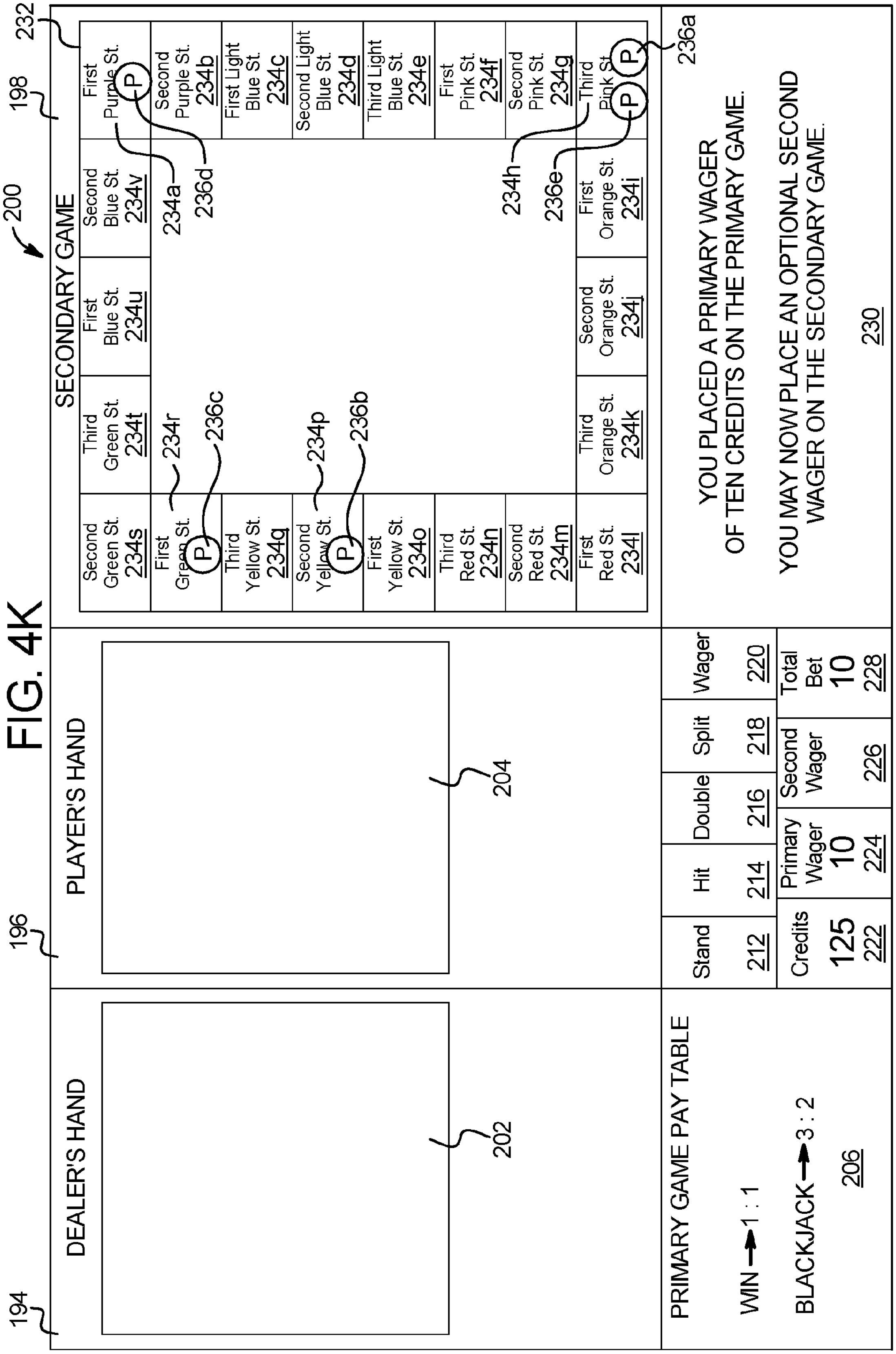
Figure 4L:
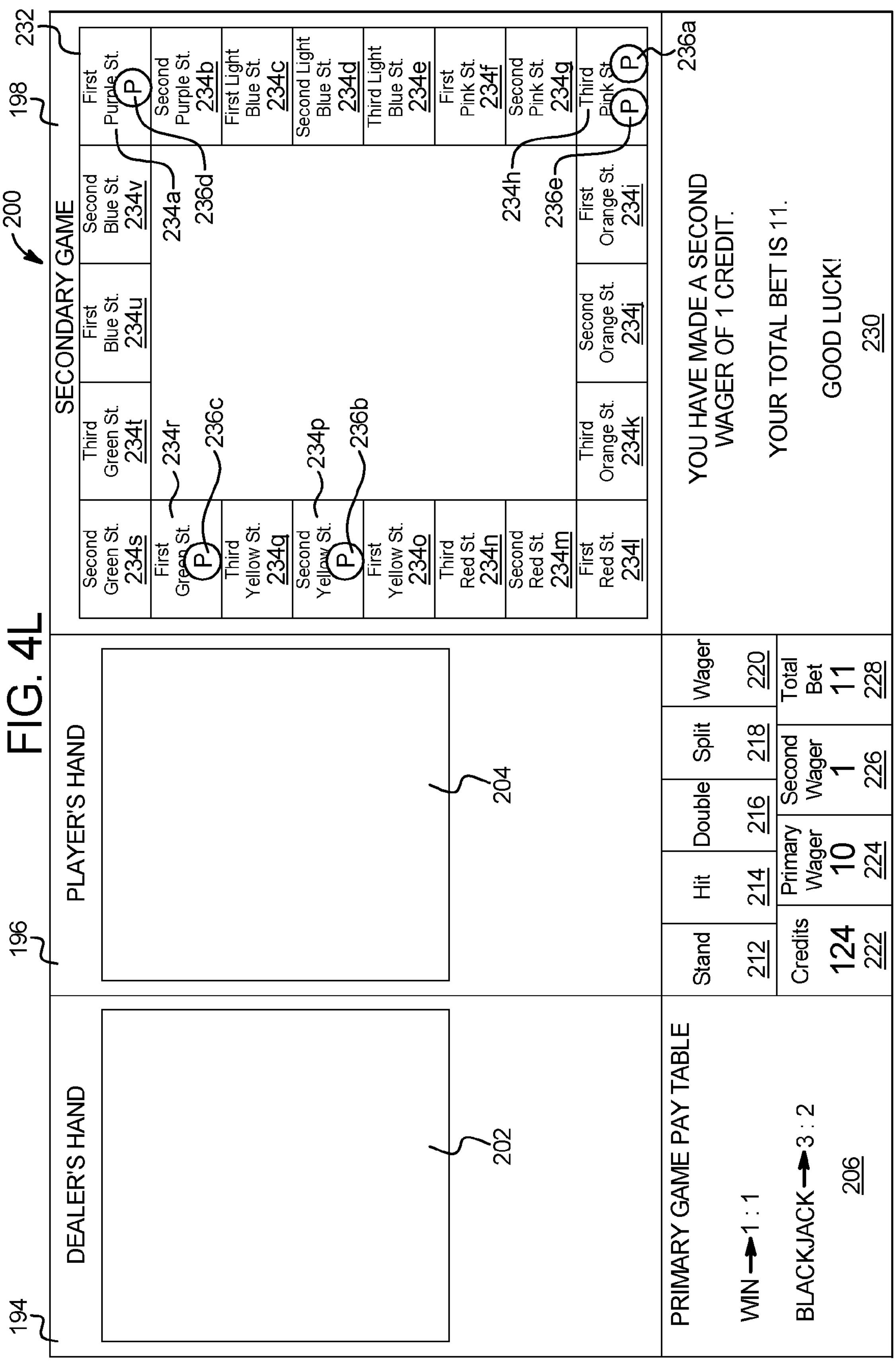
Figure 4M:
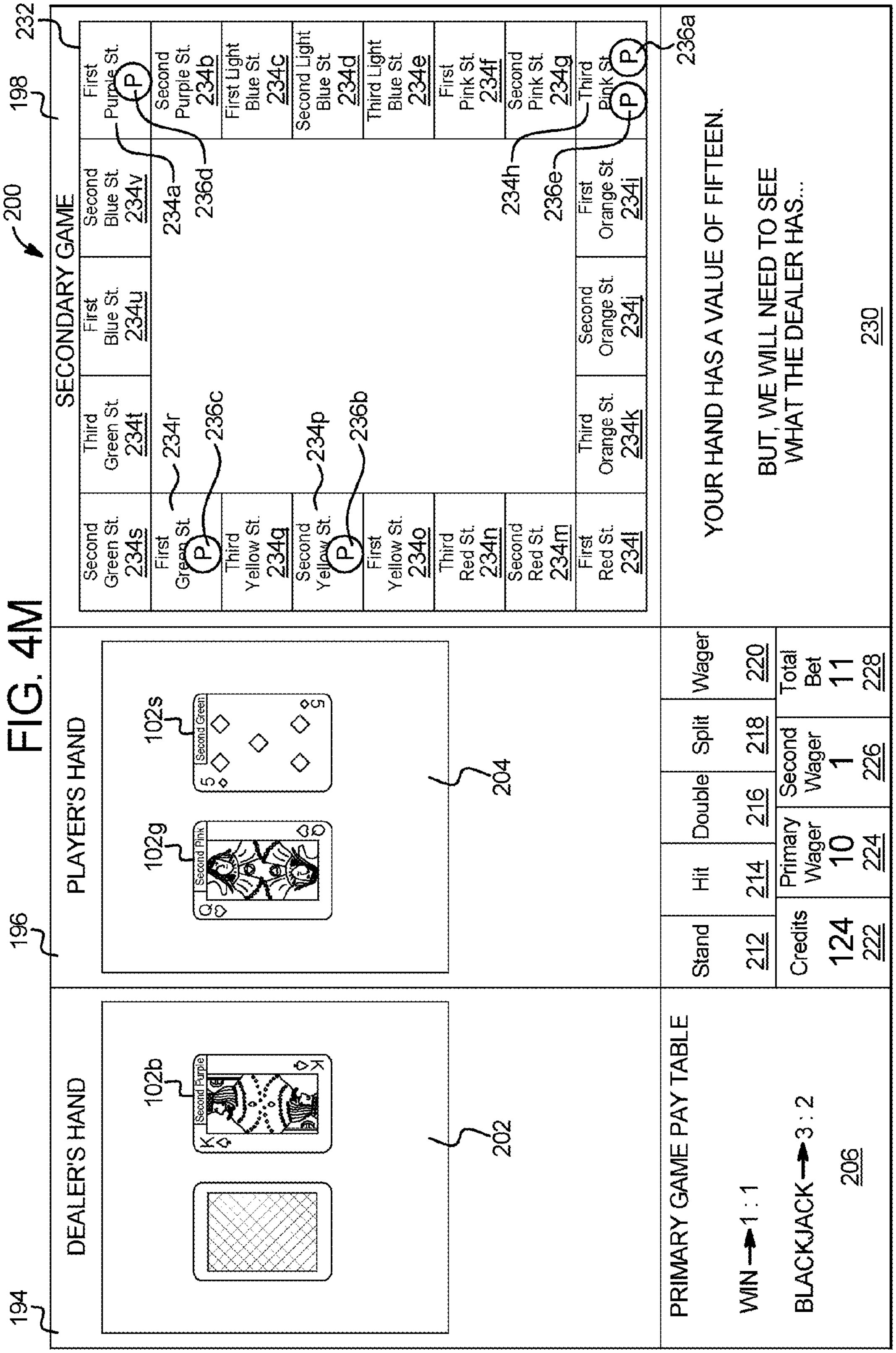
Figure 4N:
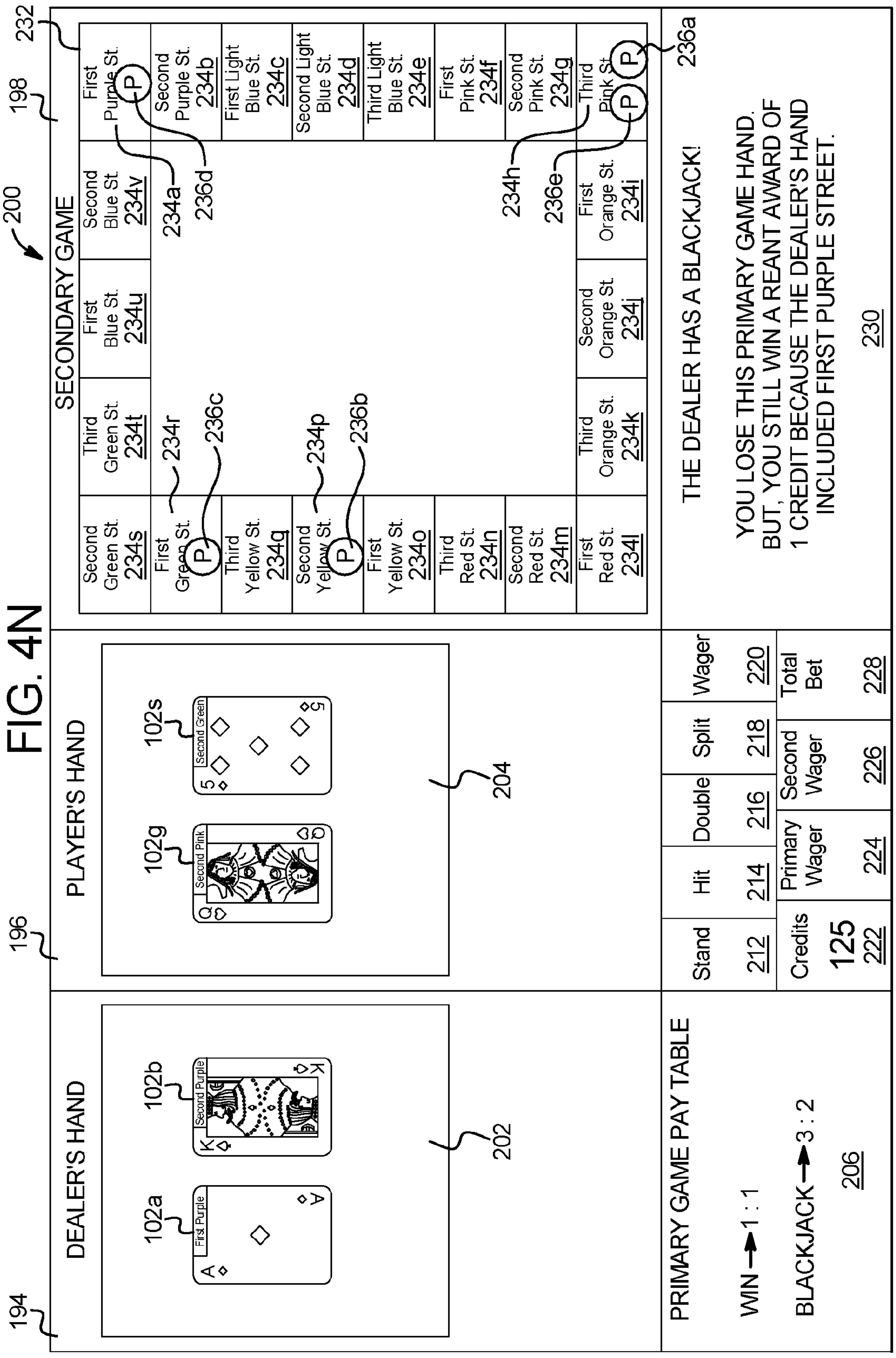
Figure 4O:
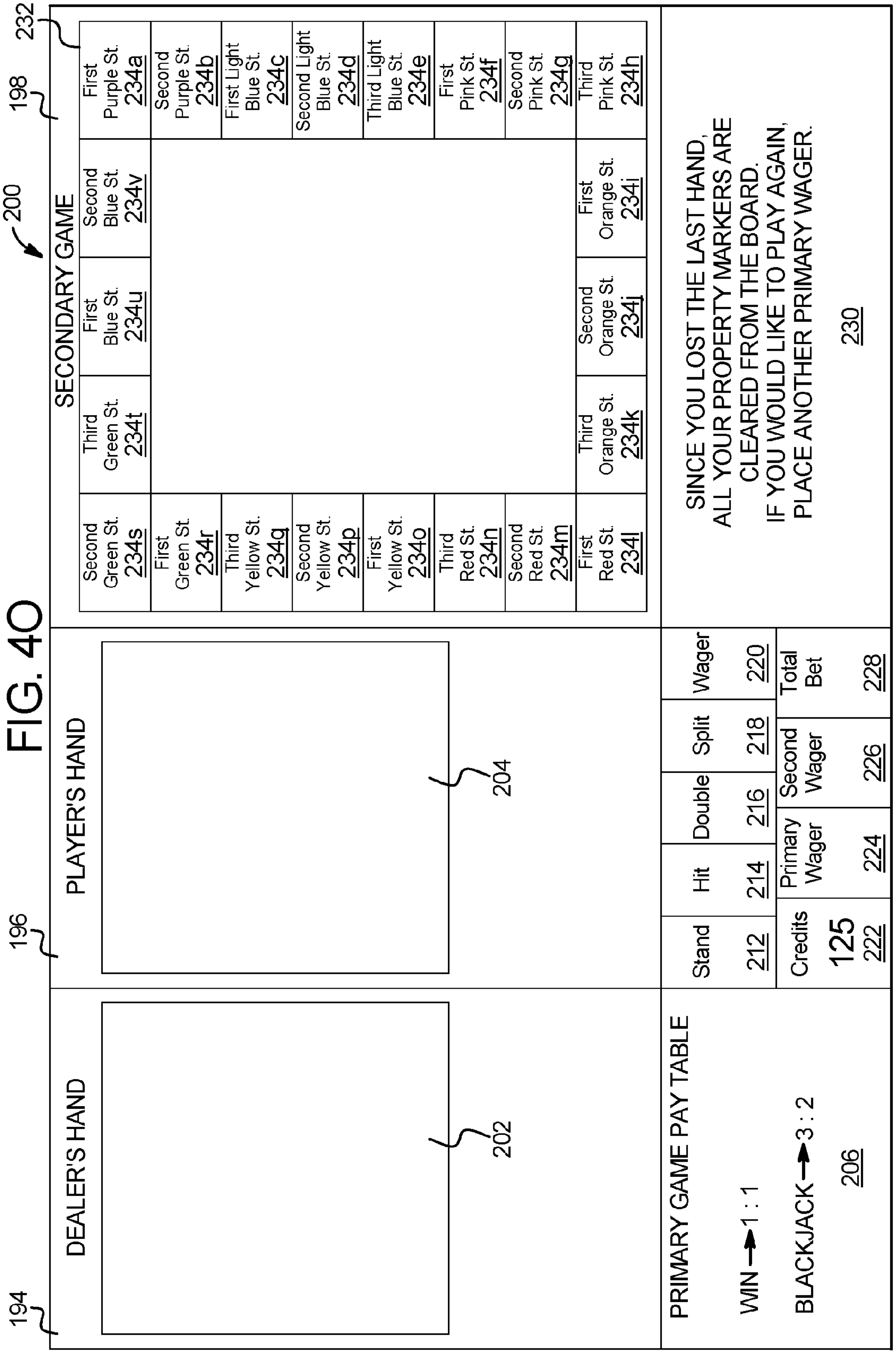

In the example embodiment of FIGS. 4A to 4O, the display 200 includes a dealer's hand display 194, a player's primary hand display 196, an area for a dealer blackjack hand 202, and an area for a player blackjack hand 204. The display 200 (which includes a touch screen in this example) includes several player inputs or buttons which enable a player to enter decisions and several displays or meters which provide the player information about the player's credits and wagers. The inputs or buttons include the stand button 212, the hit button 214, the double button 216, the split button 218, and the wager button 220. One or more of these inputs or buttons become active when appropriate during the play of the primary game. The displays include the credit meter display 222, the primary wager display 224, the second wager display 226, the total bet display 228, and message display 230.

The display 200 further displays a primary game paytable 206 of the payouts of the primary game. The primary game paytable 206 includes a one to one payout for a win, three to two for a Blackjack. It should be appreciated that the payouts may be any suitable ratio of the wager and may vary according to different house or operator rules.

The display 200 further includes a secondary game board display 198. The secondary game board display 198 shows a secondary game board 232 which includes a plurality of positions 234*a*, 234*b*, 234*c*, . . . 234*v*. Each of the positions 234*a*, 234*b*, 234*c*, . . . 234*v* is associated with a different one of the plurality of properties 102*a*, 102*b*, 102*c*, . . . , 102*v* of the secondary game. In the illustrated embodiment, the properties on the secondary game board 232 are each associated with a respective rent award (not shown), in accordance with the table of FIG. 3A. In certain embodiments, the rent awards are displayed directly on each of the properties. In other embodiments, the rent awards are listed in a secondary game table or paytable which is displayed or displayed upon request to the player.

It should be appreciated that the secondary game board 232 of the illustrated example embodiment, only includes positions that are associated with properties. A conventional Monopoly® board typically includes forty positions, where twenty-eight of the positions are each associated with a different property, three of the positions are CHANCE positions, three of the positions are COMMUNITY CHEST positions, one of the positions is a LUXURY TAX position, one of the positions is an INCOME TAX position, and the four corner positions include GO, JAIL, FREE PARKING, and GO TO JAIL. In various embodiments, the secondary game board of the present disclosure can incorporate any number or combination of these different types of positions in addition to the plurality of property positions. In such embodiments, game operators can implement their own rules as to how to handle these non-property positions (e.g., chance, community chest, free parking, jail etc.). In one embodiment, the non-property positions of the secondary game board are purely decorative elements and have no effect on game play. In one embodiment, the secondary game symbols indicated by the cards employed in the primary game include one or more non-property symbols which correspond to the non-property positions of the secondary game board. In one such embodiment, the non-property symbols act as blockers. In this embodiment, if the dealer's hand includes any cards which indicate a non-property (i.e., blocker) symbol, the player cannot collect a rent award from the dealer for that play of the game, even if the dealer's hand includes other cards which indicate secondary symbols that correspond to player-owned properties. In another embodiment, non-property symbols provide certain benefits to the player. For example, if one of the cards in the player's hand indicates a "chance" or "community chest" symbol, the player automatically receives an award, such as a designated number of credits or a free hand of Blackjack.

As seen in FIG. 4A, in this example, the player has deposited one-hundred credits and the gaming device displays the one-hundred credits in the credit meter display 222. There are no property markers on the secondary game board 232 because this is prior to the first play of the primary Blackjack game, and the player has not yet accumulated any properties. The gaming device displays a message in the message display 230 prompting the player to place a wager on the Blackjack game.

FIG. 4B illustrates that the player has made a wager of ten credits as shown in the primary wager display 224. The total bet at this point is ten as shown in the total bet display 228. The number of credits remaining has been reduced to ninety as shown in the credit meter display 222. The gaming device displays a message to the player in the message display 230 prompting the player to place the optional second wager on the secondary game.

FIG. 4C illustrates that the player has made the optional second wager of one credit as indicated in the second wager display 226. The number of credits has been reduced to eighty-nine as indicated in the credit meter display 222. The total bet is now eleven as indicated in the total bet display 228.

It should be appreciated that, in various embodiments, the amount of the second optional wager that the player can make is determined based on the amount of the primary wager. In one such embodiment, the optional second wager amount cannot be greater than the amount wagered on the primary game.

FIG. 4D illustrates that the player and the dealer have been dealt hands or initial cards. In this first example play of the primary Blackjack game, the player hand 204 is dealt with both cards face up and includes a J♥ and a 5♠. According to the table of FIG. 3B, the J♥ card is associated with the "Third Pink St." secondary property symbol. The 5♠ is associated with the "Second Yellow St." secondary property symbol. The player's hand value is fifteen based on the initial hand of two cards.

The dealer's hand 202 also has two cards including one of the cards dealt face down. The value of the dealer's up-card is displayed in the message display 230. The dealer's up-card is the 9♢, which is associated with the "Third Orange St." secondary property symbol.

The player's hand does not offer an opportunity to double or split and thus the double button 216 and the split button 218 remain inactive. The stand button 212 and the hit button 214 are activated as indicated by the highlighted buttons and in the instructions to the player in the message display 230. In this example, FIG. 4D illustrates that the player has elected to take a hit by selecting the hit button 214.

FIG. 4E illustrates that the player's hit card is a 4♢, bringing the player's total hand value to nineteen. The 4♢ card is associated with the "First Green St." secondary property symbol. The gaming device continues to provide the player the option of hitting again, as indicated by the still active hit button 214, since the player's hand value is still less than twenty-one. This is indicated in the message display 230. In this example, the player chooses to stand by selecting the stand button 212.

In FIG. 4F, the dealer's down card is revealed. The dealer's down card is an 8♥, as indicated by the dealer's hand 202 and in the message display 230. The 8♥ card is associated with the "First Red St." secondary property symbol.

The player wins the primary game with his total hand value of nineteen. Accordingly, the player is provided with an award for the primary game win. Specifically, the player wins an award of twenty credits (i.e., the original primary game wager amount of ten credits, plus ten credits). The credit meter display 222 is updated to reflect the player's award of ten credits and now shows the number one hundred nine.

Since the player made the optional second wager, the gaming device provides the player with the properties listed on each of the cards in the player's hand. That is, the player obtains Third Pink St., Second Yellow St., and First Green St., as a result of this play of the primary game. Three markers 236*a*, 236*b*, and 236*c* appear on the secondary game board display 232 on the positions associated with Third Pink St., Second Yellow St., and First Green St. (i.e., positions 234*h*, 234*p*, and 234*r*), respectively. This indicates that the player "owns" these properties. Any accumulated markers remain on the secondary game board as long as the player keeps winning plays of the Blackjack game. In one embodiment, each markers indicates the amount or value of the side bet placed by the player on the play of the game which resulted in that marker being accumulated by the player. For instance, in the example of FIG. 4F, each of the markers would display the number one (i.e., 1) to indicate the amount or value of the side bet made when those properties were accumulated.

It should be appreciated that the act of gaining properties does not directly pay the player any awards. Rather, if the player has accumulated or owns any properties on the secondary game board, on the next play of the primary game, regardless of whether the player makes the optional second wager or not, the player will have an opportunity to win one or more secondary awards. In the next play of the primary game, if any of the secondary property symbols listed on the dealer's cards match properties that the player owns, then the player wins a secondary award for each match. If the dealer's hand includes secondary property symbols that match any of the properties owned by the player, the dealer is "renting" those properties, and the dealer must pay a rent award to the player. In other embodiments, the player wins a secondary award if a secondary property symbol listed on one or the dealer's cards and a property owned by the player are related in any suitable manner and is not limited to matching.

In various embodiments, if the player places the second optional wager, the player obtains a property for one or more secondary symbols that are displayed on or indicated by: (a) the cards in the player's hand; (b) the cards in the player's hand under certain primary game conditions, such as if player's hand results in a primary game win; (c) the cards in the player's hand under certain secondary symbol rules (e.g., the player's hand must include at least two matching secondary symbols for the player to accumulate any secondary symbols); (d) the cards in the dealer's hand; (e) the cards in the dealer's hand under certain primary game conditions; (f) the cards in the dealer's hand under certain secondary symbol rules (e.g., the dealer's hand must include at least two matching secondary symbols for the player to accumulate any secondary symbols); (g) the cards of the player's hand that have a designated relationship to the cards in the dealer's hand; or (h) any other suitable condition.

In the illustrated embodiment, the primary game condition for accumulating one or more properties on the secondary game board is the player placing the second optional wager and the player winning the play of the Blackjack game. It should be appreciated, however, that a variety of other primary game outcomes or conditions may cause the player to obtain one or more properties. In various embodiments, the primary game outcome or condition that causes a player to obtain one or more properties includes: (a) a player win in the primary game; (b) a player loss in the primary game; (c) a player-dealer tie in the primary game; (d) a player blackjack in the primary game; (e) a dealer blackjack in the primary game; (f) a dealer bust in the primary game; (g) a certain number and/or type of secondary symbols appearing in both the player's hand and the dealer's hand; and (g) any other suitable primary game outcome or condition.

In certain embodiments, the player only accumulates or acquires properties if the player has received a negative result in the play of the primary game, such as if the player: (a) loses the hand; (b) busts; (c) busts after having a designated hand value (e.g., as a result of hitting on a hand with a value of twelve); (d) pushes or ties; or (e) pushes or ties with a certain hand (e.g., ties with a hand having a value of eighteen or better). Thus, accumulating a secondary symbol is a consolation for the player losing or obtaining an unfavorable outcome in the primary game. In these embodiment, the negative player experience of losing the primary game to the dealer (or obtaining another unfavorable outcome) is at least partially offset by the positive occurrence of accumulating one or more properties on the secondary game board. It should be appreciated however that such embodiments are not preferred, as a player could purposely lose in the primary game just to accumulate more properties and obtain an advantage in the secondary game.

It should also be appreciated that, in the illustrated embodiment, the player obtained a property for each secondary symbol on each of the cards that contributed to the winning outcome (i.e., each card contributing to the total hand value of nineteen). In another embodiment, the player obtains a property for each secondary symbol on each card in the player's hand, regardless of whether that card contributes to a winning outcome. In another embodiment, the player obtains a property for each secondary symbol on only the first two player cards (i.e., the cards of the initially dealt player hand. This prevents the player from taking unnecessary cards (e.g., hitting when the player should not hit). In one embodiment, if a player has split hands, the player only obtains properties indicated by the cards in one of hands. In another embodiment, if a player has split hands, the player can obtain properties indicated by the cards in both hands.

In one embodiment, the player can choose which properties indicated by the player's cards to accumulate. In one such embodiment, the player can choose up to a designated number of properties, such as one, two, or three properties. In another embodiment, the player only accumulates the most valuable property indicated by the cards in the player's hand. In other embodiments, the player can accumulate any property indicated by a card in the player's hand that has not been previously accumulated by that player or any other player. In different embodiments, the number of properties accumulated by the player is predetermined, randomly determined, determined based on a generated symbol or symbol combination, determined based on a random determination by the central controller, determined based on a random determination at the gaming machine, determined based on time (such as the time of day), determined based on a primary game wager, determined based on an amount of coin-in accumulated in one or more pools, or determined based on any other suitable method or criteria. In certain embodiments, players can trade properties with other players. In such embodiments, the players can initiate and/or complete trades with each other at any suitable time during game play.

Referring again to FIG. 4F, the gaming device displays a message in the message display 230 prompting the player to place another wager on the primary Blackjack game. FIG. 4G illustrates that the player has made another wager on the primary game of ten credits, as shown in the primary wager display 224. The total bet at this point is ten, as shown in the total bet display 228. The player has ninety nine credits remaining, as shown in the credit meter display 222. The gaming device displays a message to the player in the message display 230 prompting the player to place the optional second wager for a chance to win more properties on the secondary game board.

FIG. 4H illustrates that the player has made the optional second wager of five credits as indicated in the second wager display 226. The number of credits has been reduced to ninety four, as indicated in the credit meter display 222. The total bet is now eleven as indicated in the total bet display 228.

FIG. 4I illustrates that the player and the dealer have been dealt hands or initial cards for the example second play of the primary game. In this example play of the primary game, the player hand 204 is dealt with both cards face up and includes a J♥ and an A♠. The J♥ card is associated with the "Third Pink St." secondary property symbol. The A♠. card is associated with the "First Purple St." secondary property symbol.

The player's hand includes a Blackjack, as indicated in the hand value display 208. The dealer's hand 202 also has two cards including one of the cards dealt face down. The dealer's up-card is the K♣. The K♣. card is associated with the "Third Pink St." secondary property symbol.

In FIG. 4J, the dealer's down card is revealed. The dealer's down card is an 8♣. as indicated by the dealer's hand 202 and in the message display 230. The 8♣. card is associated with the "Third Orange St." secondary property symbol.

The player wins this play of the primary Blackjack game with a Blackjack. For the player's Blackjack win, the player obtains an award of twenty five credits (i.e., the player's primary game wager of ten credits, plus an additional fifteen credits). At this point in the game, the cards in the dealer's hand 202 are evaluated to determine whether the dealer's cards include any properties that match the properties previously accumulated (and now owned) by the player. As indicated by the markers 236*a*, 236*b*, and 236*c* on the secondary game board display 232, the player owns the following properties: Third Pink St., Second Yellow St., and First Green St. Thus, the dealer's cards are evaluated to determine whether any of these specific properties appear in the dealer's hand.

In the illustrated embodiment, the player can only win a secondary award (i.e., collect a rent award) from the dealer if the player owned the property prior to the start of the play of the primary game. That is, when the player wins properties in one play of the primary game, the player can only collect a rent award on those properties for subsequent plays of the primary game. Thus, if the player gains a certain property as a result of one play, the player does not get paid a rent award for that property on that same play even if the dealer has that property in the dealer hand for that play. In other embodiments, the player can gain properties in one play of the primary game and get paid a rent award based on the dealer's cards in that same play, rather than having to wait until the next play to determine whether the dealer has any cards with the player's properties.

In the illustrated example, the dealer's hand 202 includes Third Pink St. (on the K♣. card) and Third Orange St. (on the 8♣. card). Since the player owns Third Pink St., as indicated by the player marker 236*a* on this property on the secondary game board display 32, the dealer must pay the player a rent award for this property. The rent associated with Third Pink St. is eight credits, according to the table of FIG. 3A. Accordingly, the dealer must pay the player an additional eight credits as a rent award, in addition to the credits won as a result of the player's win in the Blackjack game. As indicated by the credit meter display 222, the player won a total of thirty seven credits (i.e., twenty five credits for the primary game, plus eight credits in the form of the rent award), and the credit meter display 222 now shows the number one hundred thirty five.

In addition, since the player made the optional second wager 228 and obtained a winning outcome (i.e., a Blackjack) in the second play of the primary game, the gaming device provides the player with the properties listed on each of the cards forming the Blackjack. That is, the player obtains markers for the following properties: First Purple St. (for the A♣. card) and Third Pink St. (for the J♥ card). In one embodiment, the player can win an additional award or prize if the player accumulates a property that the player already owns.

As seen in the illustrated embodiment, for obtaining successive wins in the primary game, the player accumulates more markers on positions of the secondary game board. The player's chance to win secondary awards increases as the number of positions accumulated or marked by the player increases. Thus, achieving multiple wins in a row in the primary game is exciting for the player. In another embodiment, a player gains markers on positions of the secondary game board if the player placed the optional second wager and the secondary game outcome includes a designated outcome.

As seen on the secondary game board 232, a property marker 236*d* is displayed on position 234*a* because the player now owns First Purple St. Additionally, a second property marker 236*e* is displayed on position 234*h* (i.e., Third Pink St.). Since the player already owned Third Pink St., the player has two property markers 236*a* and 236*e* on this property. If, in a subsequent play of the primary game, the dealer's hand includes a card with the "Third Pink St." secondary property symbol, the dealer will pay the player twice—once for each property marker (i.e., the player gets double the designated rent award for this property). This assumes, however, that the player will still own this property at that time.

In the illustrated embodiment, if the player gets the same property twice (i.e., twice in one hand or twice in two consecutive winning hands), the property becomes more valuable for the player. That is, if the dealer's hand in a subsequent play of the primary game includes this property, the dealer pays the designated rent award twice.

In one such embodiment, if the player gets a property after the player already has a marker on that property, the player obtains another property marker on the property. If the dealer's hand in a subsequent play of the primary game includes this property, the dealer then pays the player once for each property marker on that property. In another embodiment, rather than putting two property markers on a property that a player has accumulated twice, a value associated with the property marker on that property increases. In such an embodiment, if the dealer's hand in a subsequent play of the primary game includes that property, the total rent award paid to the player is based at least in part on the value of the property marker. For example, if a player has a property marker on a certain property and gets that property again, the property marker now has a value of two. The total rent award paid to the player if the dealer's hand in a subsequent play of the primary game includes this property will be two times the rent award associated with that property. If a player obtains a certain property five times (without ever losing it), the property marker on that property would have a value of five. Therefore, the total rent award paid to the player if the dealer's hand in a subsequent play of the primary game includes this property will be five times the rent award for the first property marker.

In one embodiment, the value of each property marker depends on the second optional wager placed by the player. For example, for a first play of the primary game, a player places a second optional wager of one credit and wins a first property as a result of the primary game outcome. The property marker placed on the first property includes or shows the number "1" to indicate the amount of the optional second wager that the player placed. For a next play of the primary game, a player places a second optional wager of one credit and wins the same property again as a result of the primary game outcome. In this embodiment, a new marker is not placed on this property. Rather, the existing marker now includes or shows the number "2." If the dealer's hand in a subsequent play of the game includes a card with a secondary symbol that represents the first property, the dealer will have to pay the player the designated rent for that property times the number shown on the property marker (i.e., two).

In a further embodiment, if the player gets the same property twice, the player gets the opportunity to add upgrades to the property, such as various types of buildings, infrastructure, or other suitable upgrades or improvements. In one embodiment, if a player already owns a particular property and wins the same property again, such as in a subsequent play of the primary game, the player can add a designated number of upgrades to the property free of charge. In another embodiment, the player must pay an additional amount to purchase upgrades. That is, winning the same property for the second time makes the player eligible to purchase upgrades. Adding upgrades to a property, makes the property more valuable to the player because rent awards are higher for upgraded properties than for unimproved properties. The rent award associated with a property increases based on the type and number of upgrades added to the property.

In other embodiments, once a player owns a certain property, the player cannot gain any further markers on that property even if the player wins more plays of Blackjack with that property listed on one or more of the cards in the player's hand.

In one embodiment, the properties are classified or divided into a plurality of different property groups or families. Each group or family of properties includes a plurality of the properties. In one such embodiment, the player obtains increased awards or multipliers if the player collects all of the properties of a particular group (i.e., obtains all of the properties of one color group, such as all the "Yellow" properties). In various embodiments, if the player collects all of the properties of a particular group, rents for each of the properties in that group of properties are doubled, tripled, quadrupled, etc. In one such embodiment, the degree or extent to which the rents are magnified or multiplied depends on the number of properties in the group. For example, if the player collects all of the properties in the yellow group (i.e., First Yellow St., Second Yellow St., and Third Yellow St.), the normal or standard rents associated with each of the properties of this group would triple because there are three yellow properties on the board. That is, the dealer has to pay the player three times the rent for each of the properties in the yellow group. In another embodiment, the dealer pays an additional award of a set amount to the player on top of any rent owed to the player when the dealer rents one of the properties of a completed group. In one embodiment, the gaming system provides a player an additional award or prize for accumulating a family of properties. In another embodiment, the gaming system provides a player an additional award or prize for accumulating a certain number of properties, such as three, four, or five properties. In one embodiment, the gaming system enables a player to redeem properties for an additional award or prize. For example, if a player has earned three properties, the gaming system enables the player to redeem those three properties for a first prize, or the gaming system enables the player to try to earn a fourth property and redeem four properties for a second better prize. If the player chooses to try to accumulate the fourth property (rather than redeeming the three properties for the first prize), the player is taking the chance that he will lose his properties before he can accumulate all four properties to get the second better prize.

In various embodiments, rent awards are based at least in part on the value of the player's second optional wager. In on such embodiment, the amount of the optional second wager placed along with the primary game wager is recorded on any property markers that the player obtains as a result of the play of the primary game. For example, if the player gains the "First Blue St." property when betting one credit as the optional second wager, then the property marker on First Blue St. would say "one credit," and all rent awards for that property would be multiplied by one. Similarly, if the player gains the "Second Blue St." property as a result of a play of the primary game for which the player placed an optional second wager of five credits, the player's marker on Second Blue Street would say "five credits," and all rent awards for that property would be multiplied by five.

In certain embodiments, the dealer can acquire properties during primary game play, which can turn into neutral or spoiler events for a player. In one such embodiment, if both a dealer and a player have a same property indicated by one of the cards in their hands in a play of the Blackjack game, that property would not be acquirable by the player. In one such embodiment, if that same card appears in the player's hand in a subsequent play of the Blackjack game, the property would be acquirable by the player.

In one embodiment, the gaming system enables the dealer to acquire non-property "spoiler" symbols during primary game play. For example, if the dealer's hand includes a card with a "Go to Jail" symbol, this causes the player to lose one, a plurality, or all of the player's property markers. In one embodiment, such spoiler symbols only appear on a relatively small number of cards. For example, the "Go to Jail" symbol is only indicated by one of the cards in all six decks utilized for the primary game. In another embodiment, non-property spoiler symbols result in a non-paying event. In one such embodiment, if the dealer's hand includes a card with a spoiler symbol, the player is not directly penalized, but the player cannot receive any rent awards from the dealer for that play of the game, even if the dealer's hand includes cards which indicated properties owned by the player.

As seen in FIG. 4J, the gaming device displays a message in the message display 230 prompting the player to place another wager on the primary Blackjack game. FIG. 4K illustrates that the player has made a wager of ten credits as shown in the primary wager display 224. The total bet at this point is ten as shown in the total bet display 228. The number of credits remaining is one hundred twenty five, as shown in the credit meter display 222. The gaming device displays a message to the player in the message display 230 prompting the player to place the optional second wager.

FIG. 4L illustrates that the player has made the optional second wager of one credit, as indicated in the second wager display 226. The number of credits has been reduced to one hundred twenty four, as indicated in the credit meter display 222. The total bet is now eleven, as indicated in the total bet display 228.

FIG. 4M illustrates that the player and the dealer have been dealt hands or initial cards. In this third example play of the primary game, the player hand 204 is dealt with both cards face up and includes a Q♥, which is associated with the "Second Pink St." secondary property symbol, and a 5♢, which is associated with the "Second Green St." secondary property symbol. The player's hand value is fifteen.

The dealer's hand 202 also has two cards including one of the cards dealt face down. The dealer's up-card is the K♠. which is associated with the "Second Purple St." secondary property symbol. Since the dealer has a K♠. as the up-card, this requires an immediate resolution as to whether or not the dealer has Blackjack. In FIG. 4N, the dealer's down card is revealed. The dealer's down card is an A♢, which is associated with the "First Purple St." secondary property symbol. The dealer's hand of the K♠. and the A♢ gives the dealer a Blackjack, as indicated by the dealer's hand 202 and in the message display 230. Accordingly, the player loses this play of the primary Blackjack game.

Although the player has lost the play of the primary Blackjack game against the dealer, the player still owns properties on the secondary game board 232, as indicated by the markers. Specifically, the player has two markers on Third Pink Street (i.e., position 234*h*); one marker on Second Yellow St. (i.e., position 234*p*); one marker on First Green St. (i.e., position 235*r*); and one marker on First Purple St. (i.e., position 234*a*). Thus, the player still has the opportunity to win secondary game awards (i.e., rents paid by the dealer).

Accordingly, at this point, the dealer's hand 202 is evaluated to determine whether any of the cards in the dealer's hand 202 include secondary symbols that match any of the properties owned by the player. As seen in FIG. 4N, the dealer's hand 202 includes the A♢ and the K♠. which are associated with secondary property symbols for First Purple St. and Second Purple St., respectively. The player owns First Purple St., as indicated by the marker 236*d* on position 234*a* of the secondary game board 232. The dealer must pay the respective rent award for this property. According to the table of FIG. 3A, First Purple St. is associated with a rent award of one credit. An additional one credit is therefore provided to the player, as indicated by the credits display 222, which now shows the number one hundred twenty five.

In the illustrated embodiment, even if the player loses the primary game hand, there is still an evaluation of the dealer's hand. Thus, the player still has an opportunity to win secondary game awards (i.e., rent awards) if there are any cards in the dealer's hand with secondary symbols that match any player-owned properties. However, since the player lost in the primary game, the player does not accumulate any more properties on the secondary game board. Additionally, all of the properties that were previously accumulated by the player will be cleared from the secondary game board because the player lost the primary game. As seen in FIG. 4O, the player has no property markers remaining on the secondary game board 232.

In the illustrated embodiment, when the player loses the primary game, the player loses all properties that the player previously accumulated during primary game play. In other embodiments, the player loses one or a plurality, but not all, of the previously accumulated properties. In different embodiments, the number of properties lost is predetermined, randomly determined, determined based on a generated symbol or symbol combination, determined based on a random determination by the central controller, determined based on a random determination at the gaming machine, determined based on time (such as the time of day), determined based on a primary game wager, determined based on an amount of coin-in accumulated in one or more pools, or determined based on any other suitable method or criteria. In a further embodiment, the player loses properties according to a specified order. For example, the player loses the most valuable properties first, or the player loses properties in the order in which they were accumulated (i.e., in a "first in, first out" manner). In one embodiment, a player loses a property once the player wins an award based on that property. In another embodiment, a player loses a property once the player wins an award of a designated amount based on that property. In one embodiment, if the player wins a secondary award of a designated amount, the player loses one, a plurality, or all of any previously accumulated properties. In other embodiments, a player loses a property after a certain number of plays of the primary game or after a certain amount of time after that property was acquired. That is, once acquired by a player, a property "lasts" for a certain number of plays of the game or a certain amount of time. In one embodiment, the player loses one, more, or all of any previously accumulated properties if none of the cards in the player's hand have secondary symbols. In another embodiment, the player loses one, more, or all of any previously accumulated properties if a designated number, such as all, of the cards in the dealer's hand have secondary symbols. In certain embodiments, if the determination is made that a player will lose one or more of his properties, the player can pay a fee to keep one or more of those properties.

In one embodiment, if a player discontinues wagering on the primary game such as by leaving or cashing out of the gaming device, all of the accumulated properties are forfeited. In alternate embodiments, the player may be allowed to save the accumulated properties under certain circumstances.

In another embodiment, when a player leaves a gaming device, the accumulated properties are stored on an internal or portable memory device, or stored in memory such as on a Local Area Network. It should also be appreciated that in one embodiment the secondary game may be tied to the player's player tracking card which will enable the player to store and retrieve any accumulated properties to continue to play the secondary game.

In one embodiment, when a player leaves gaming device, the player's properties will be saved for a limited period of time. In one embodiment, where a player has left the primary game, a computing device may keep track of the limited amount of time before the player must return to wagering on the primary game. If the time expires, any previously accumulated properties may be forfeited or suitably stored for later play.

In another embodiment, if a first player cashes out and leaves the primary game having accumulated at least one property, a new second player may start playing in place of the first player and have the option of using the first player's accumulated properties.

In one embodiment, the accumulation of properties can impact the primary game. For example, if a player ties the dealer in a play of the primary game, the player can use his accumulated properties to break the tie. In one such embodiment, all of a player's properties must be relinquished when the player decides to break a tie in this manner. In another embodiment, only some of the player's properties may be required to break the tie, and only those properties used to break the tie are lost. In various embodiments, which properties or the number of properties required to break the tie is based on the value of the properties.

Referring now to FIGS. 5A, 5B, 5C, 5D, 5E, 5F and 5G, one multi-player example embodiment of the present disclosure is shown where the primary game includes a Blackjack game and the secondary game includes the same secondary board game described above.

In one embodiment, the Blackjack game is playable at a physical gaming table with a live dealer, gaming chips, and one or more decks of the designated cards including additional secondary symbols, as described above. In this embodiment, the gaming table includes a plurality of player positions and a single dealer position. In this embodiment, the gaming table is associated with a tracking system configured to track cards dealt and wagers placed. The tracking devices can be any suitable device capable of identifying the values of physical cards dealt and chips placed on the table, and storing the information into a memory device. The gaming system includes at least one processor configured to process the tracked wager, card information, and property accumulation information for each player. This relieves the dealer from needing to track which players have accumulated which properties and thus facilitates game play. In this embodiment, the gaming table includes one or more displays that are configured to display the cards, the wagers, and the secondary game to the players.

In another embodiment, the Blackjack game is playable at a gaming table with a live dealer, and the game includes a virtual set of the designated cards. That is, in this embodiment, the game is playable with standard physical gaming chips but with a virtual set of cards that are displayed to the player on a display device. Therefore, the dealer's responsibility includes taking in wagers and paying out awards, but does not include dealing the actual cards.

In another embodiment, the Blackjack game is playable at a physical gaming table with a virtual dealer and one or more virtual sets of cards. In this embodiment, the gaming table includes a plurality of player stations, each station having a display and appropriate input/output devices.

In one embodiment, the Blackjack game is playable at a gaming table which includes a touch-sensitive table top usable by a plurality of players. In one such embodiment, the gaming system includes a touch sensitive table top implemented using Frustrated Total Internal Refraction (FTIR) technology to sense a plurality of simultaneous touches of the table top. For example, the gaming system may use the SURFACE™ product manufactured by the Microsoft Corporation.

In certain embodiments, the present disclosure is provided through a data network such as the internet. In this embodiment, the gaming system connects to remote terminals such that a plurality of player can participate in the game while in physical proximity to one another. In an embodiment, the gaming system is implemented over a network and limited to a particular gaming establishment such as a casino. In this embodiment, multiple players can be seated at individual gaming consoles that are stationed at various locations through the casino and all be connected and participating in the same game. In another embodiment, the gaming system is implemented or a network and through a plurality of different gaming establishments. In another embodiment, the gaming system is implemented over a network in one or more gaming establishments and over the Internet. In this embodiment, different players can participate in the same game while separately located at multiple locations within a gaming establishment and from one or more remote terminals such as a home personal computer connected to the Internet.

Figure 5A:
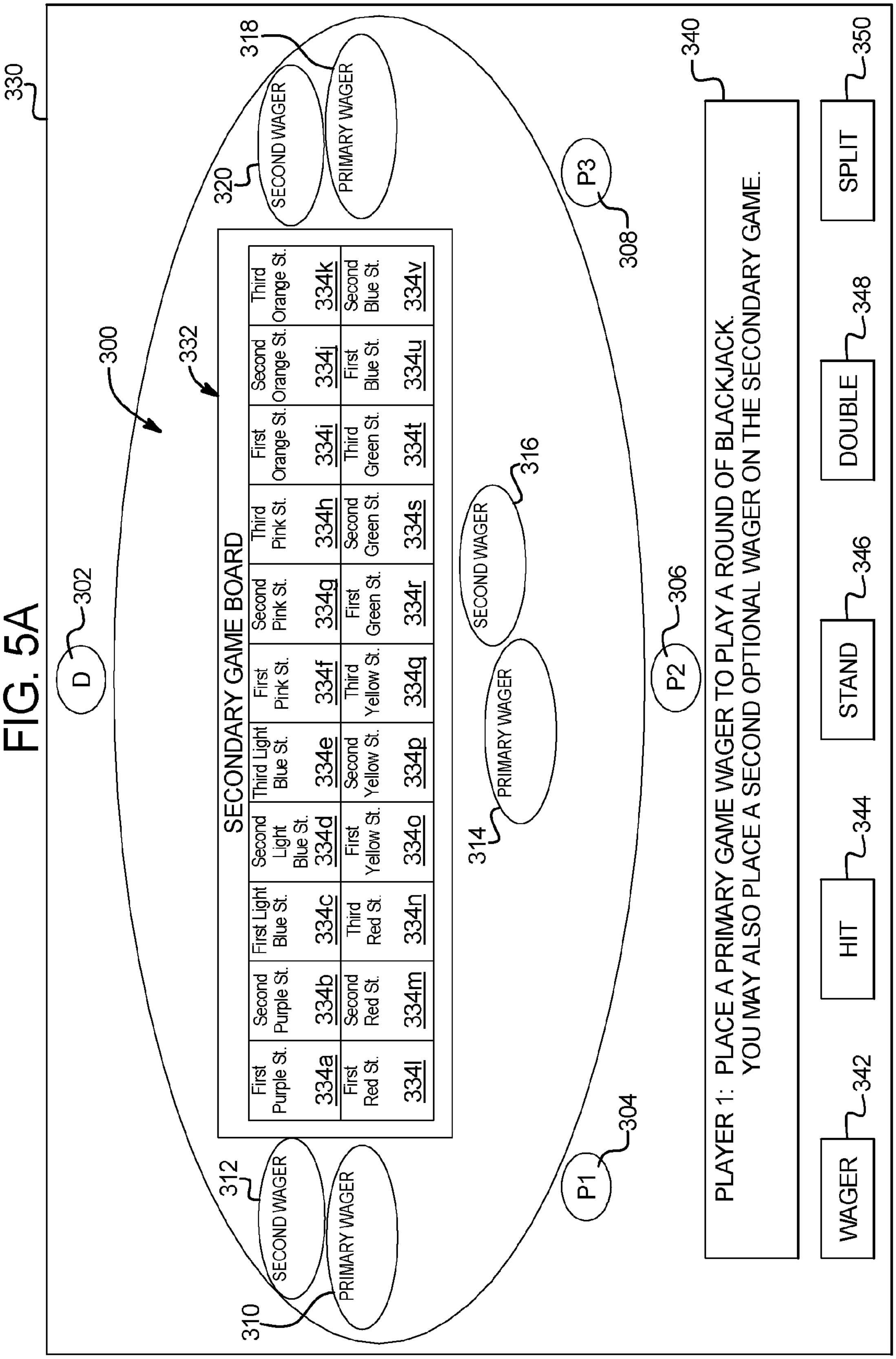
FIGS. 5A, 5B, 5C, 5D, 5E, 5F and 5G are illustrations of screen displays for an example round of play of the game according to one multi-player embodiment of the present disclosure.

As seen in the example of FIGS. 5A to 5G, the Blackjack game is played at a virtual game table represented by the play area 300. In FIG. 5A, a virtual dealer 302 is positioned at the rear of the virtual game table and the players 304, 306 and 308 are positioned about the remainder of the virtual game table. The play area 300 includes a primary wager area 310 and a second wager area 312 for Player one 304; a primary wager area 314 and a second wager area 316 for Player two 306; and a primary wager area 318 and a second wager area 320 for Player three 308. It should be appreciated that the number of players may be greater than or less than three, and the players and dealer may be positioned on the display device or virtual game table in any suitable configuration.

The play area 300 includes a secondary game board 332 associated with the secondary game. The secondary game board 332 includes a plurality of positions 334*a*, 334*b*, 334*c*, . . . , 334*v*. Each of the positions 334*a*, 334*b*, 334*c*, . . . , 334*v* of the secondary game board 332 is associated with a different one of the plurality of properties 102*a*, 102*b*, 102*c*, . . . 102*v* listed in the table of FIG. 3A. In the illustrated embodiment, each of the properties associated with the positions 334*a*, 334*b*, 334*c*, . . . , 334*v* on the secondary game board 332 is associated with a respective rent award amount, in accordance with the table of FIG. 3A. It should be appreciated that the rent awards associated with the properties may be listed on the game board itself, or may be listed in a separate paytable. It should also be appreciated that the secondary game board of the present disclosure may include any number of positions, arranged in any order or configuration.

In the illustrated embodiment, the gaming device display 330 includes a message display 340, a wager input 342, a hit input 344, a stand input 346, a double input 348, and a split input 350. As seen in FIG. 5A, the gaming device displays a message in message display 342 prompting Player one 306 to place a primary game wager to play a first round of the Blackjack game and to optionally place second wager on the secondary game.

This embodiment employs a virtual set of cards, which includes one or more designated decks of cards, such as the example deck illustrated by the table of FIG. 3B. It should be appreciated that the game may be played with any suitable number of these designated decks. For example, traditional games of Blackjack are typically played with one to six decks of cards at a time.

Figure 5B:
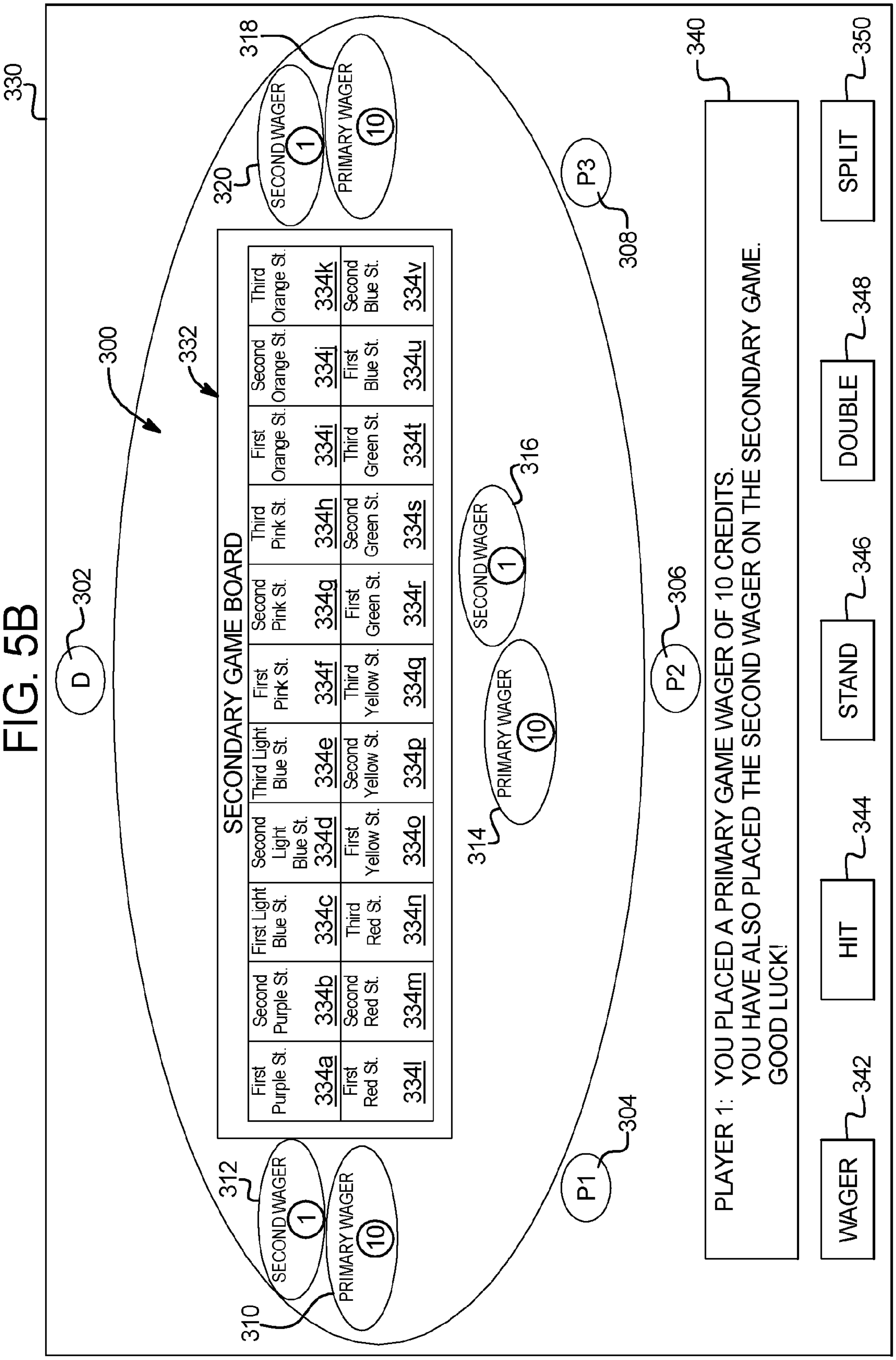

As seen in FIG. 5B, Player one 304 has placed a primary game wager of ten credits, as seen in Player one's primary wagering area 310. Player one 304 has also placed a second wager of one credit, as seen in Player one's second wagering area 312. Player two 306 and Player three 308 each placed primary game wagers of ten credits to play the Blackjack game, as seen in the primary and second wagering areas for Player's two and three. Players two and three have also placed second wagers of one credit on the secondary game, as seen in the primary and second wagering areas for Player's two and three. In one embodiment, virtual chips represent each player's credits and the amount of any wager or combination of wagers placed. In one such embodiment, when player deposits its money into the gaming device, the deposited money is converted into on-screen virtual chips. In one such embodiment, the player can place a wager by touching any virtual chip and moving his virtual chips to his respective wagering area. Wagers can be added to or removed until the player's wager is correct. When all wagers have been made, the wagers are locked in and the first two virtual cards are dealt to each player.

Figure 5C:
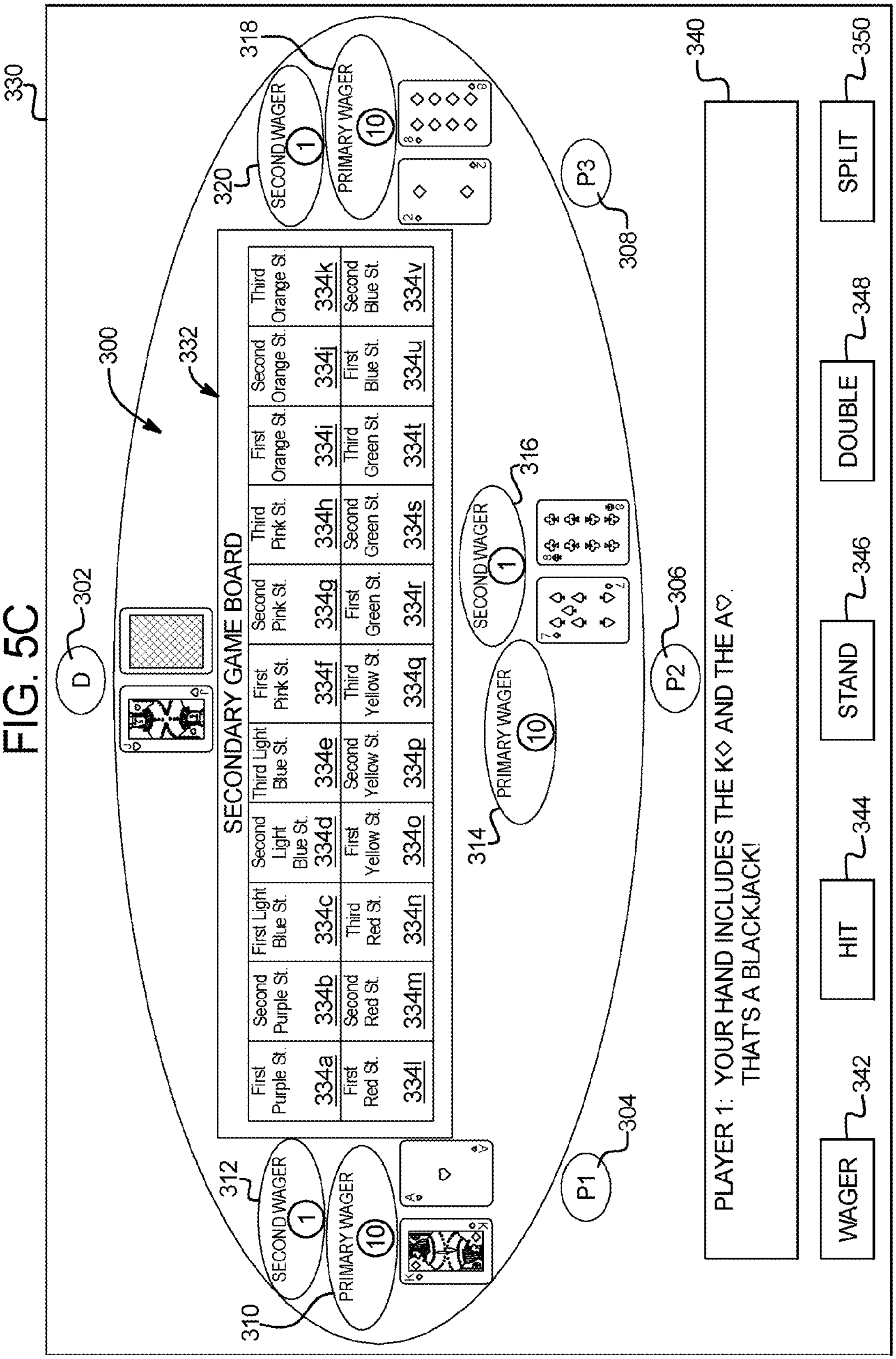

As illustrated in FIG. 5C, initial two-card hands 322*a*, 322*b*, 322*c* are dealt to each of the players 304, 306 and 308, respectively, from the virtual set of designated cards. Each of the player hands 322*a*, 322*b*, and 322*c* includes two face-up cards, and the dealer's hand 324 includes one face up card, which is the J♥ and one face-down card. As indicated by the message display 342, Player one's hand 322*a* includes the K♢ and the A♥, which is a Blackjack. Player two's hand 322*b* includes the 7♠. and the 8♣. Player three's hand 322*c* includes the 2♢ and the 8♢.

Figure 5D:
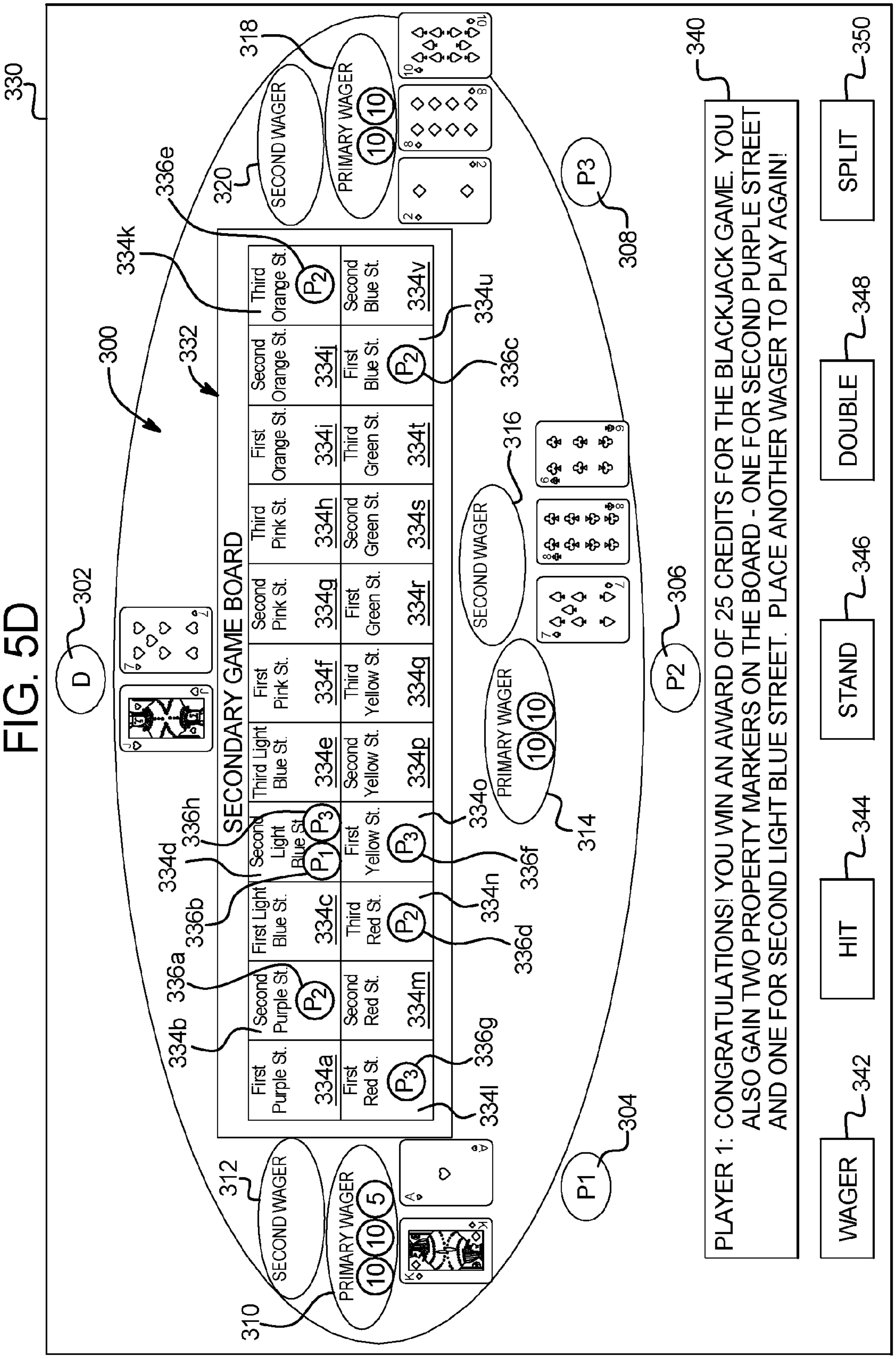

As shown in FIG. 5D, the play of the primary game has proceeded according to traditional Blackjack rules. That is, Player two 306 and Player three 308 each chose to hit. More specifically, Player two 306, whose initial hand 322*b* had a total value of fifteen, chose to hit and received a 6♣. Player two's hand 322*b* now includes a 6♣. a 7♠.and an 8♣. and has a total value of twenty one. Player three's hand 322*c* includes a 2♢, an 8♢, and a 10♠. which has a total value of twenty.

The dealer's down-card in the dealer hand 324 is revealed. The down-card in the dealer hand 324 is the 7♥, such that the value of the dealer hand 324 is seventeen.

All the player hands are complete. Player one's hand 322*a* is a Blackjack. As indicated by the message display 342, Player one 304 wins an award of twenty five credits based on the conventional 3:2 payout for the Blackjack and the player's primary game wager of ten credits. Additionally, since Player one 304 achieved a winning outcome in the primary game, Player one 304 accumulates the properties associated with the cards in Player one's winning hand 322*a*. It should be appreciated that, in this example, each deck of cards used in the Blackjack game has the same property mapping as the deck of FIG. 3B. However, for ease of illustration, the secondary property symbols are not directly displayed on the cards in this example.

Player one's hand 322*a* included the K♢ and the A♥. The K♢ is associated with the "Second Light Blue St." secondary property symbol, and the A♥ is associated with the "Second Purple St." secondary property symbol, according to the table of FIG. 3B. Thus, Player one obtains the Second Light Blue St. and Second Purple St. properties. Markers 336*a* and 336*b* for Player one 304 are placed on positions 334*d* and 334*b* which correspond to Second Light Blue St. and Second Purple St., respectively.

In an alternative embodiment, a player accumulates properties on the secondary game board based at least in part on the value of the player's Blackjack hand. In one such embodiment, the Blackjack game does not necessarily require designated cards that include secondary indicia or symbols. In such an embodiment, after the dealer hand and any player hands have been resolved, each player who obtained a winning outcome moves on or around the secondary game board (i.e., or moves a player piece representing the player) based on the value of his or her hand of cards in the Blackjack game. The player accumulates the property that the player lands on after moving around the board.

In one embodiment, the number of moves the player will make around the board is equal to the total value of the player's hand. For example, a player's hand has a total value of twenty. As a result, the player moves twenty positions on board and lands on the "Third Pink St." property. If the player's hand is a winner, player gains ownership of Third Pink St. No additional payment is necessary for the player to obtain ownership of this property. On the other hand, if the player's hand was not a winning hand, the player does not own the property. In another embodiment, the player moves on the board in stages, wherein, for each stage, the player moves a number of positions around the board which corresponds to the value of one of the cards in the player's hand. For example, if a player's hand has a total value of nineteen and includes a ten card and a nine card, the player first moves nine positions around the board and obtains the property associated with the position he lands on. Then, the player moves around the board another ten positions and obtains another property associated with the second position he lands on. In one such embodiment, the player moves around the board based on the card having the lowest value first. In another embodiment, the player moves around the board based on the card having the highest value first. In one embodiment, only the value of the first card or first two cards dealt to the player is used to determine the number of moves the player will make. In other embodiments, only the value of the highest card or the value of the lowest card is used to determine how many moves the player will make. It should be appreciated that the number of moves provided to the player may be determined in any suitable manner.

Referring again to FIG. 5D, Player two's hand 322*b*, which had a total value of twenty one, also wins against the dealer's hand 324. Accordingly, Player two 306 wins an award of 20 credits for the play of the primary game. In addition, Player two 306 obtains the properties associated with the cards of his winning hand. Player two's hand 322*b* included the 6♣. the 7♠and the 8♣. These cards are associated with the secondary property symbols for First Blue St., Third Red St., and Third Orange St., respectively. Accordingly, as indicated on the secondary game board 332, markers 336*c*, 336*d*, and 336*e* for Player two have been placed on positions 334*m*, 334*t*, and

334*k*, which correspond to First Blue St., Third Red St., and Third Orange St., respectively.

Player three's hand 322*c*, which had a total value of twenty, also wins against the dealer's hand 324. Accordingly, Player three 308 wins an award of 20 credits for the play of the primary game. In addition, Player three 308 obtains the properties associated with the cards of his winning hand. Player three's hand 322*c* included the 2◇, the 8◇, and the 10♠. These cards are associated with the secondary property symbols for First Yellow St., First Red St., and Second Light Blue St., respectively. Accordingly, as indicated on the secondary game board 332, markers 336*f*, 336*g*, and 336*h* for Player three have been placed on positions 334*s*, 334*v*, and 334*d*, which correspond to First Yellow St., First Red St., and Second Light Blue St., respectively.

In the illustrated embodiment, both Player one and Player three obtained the same property (i.e., Second Light Blue St) as a result of this play of the primary game. In different embodiments, multiple players can not own the same property. In one such embodiment, a player has to wait until a property is not owned by any other player to accumulate that property. In one embodiment, a property can be lost by a first player and accumulated by a second player in association with the same play of the primary game. In another embodiment, if a property is lost by a first player as a result of one play of the primary game, a second player can only accumulate that property in a subsequent play of the primary game.

In FIG. 5D, the gaming device prompts Player one 306 to place another wager to play a second play of the Blackjack game, as indicated by the message in message display 342.

Figure 5E:
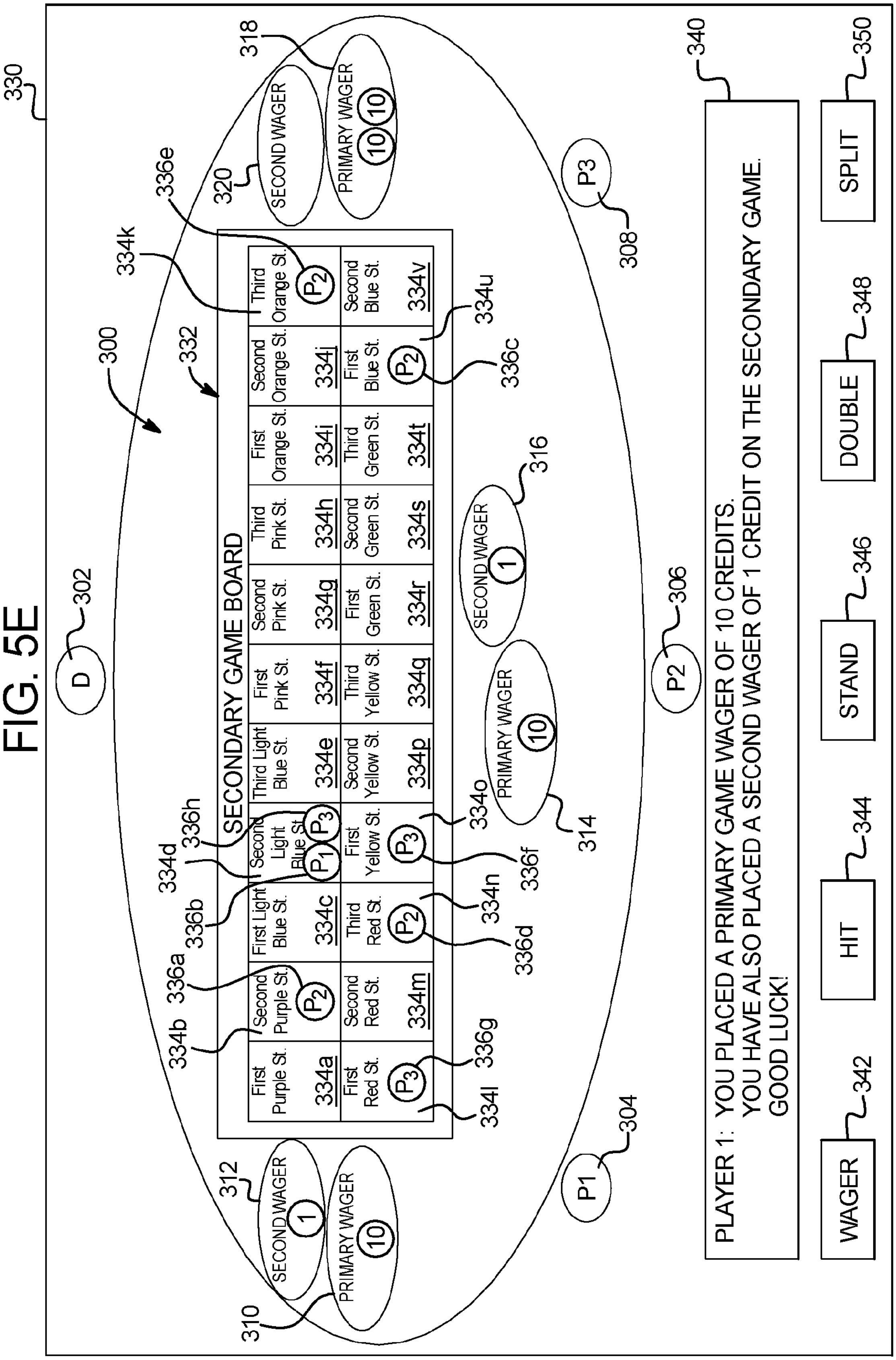

As seen in FIG. 5E, Players one, two, and three have each placed another primary game wager of ten credits to participate in a second play of the Blackjack game. Players one, two, and three have each placed an optional second wager of one credit, as well.

Figure 5F:
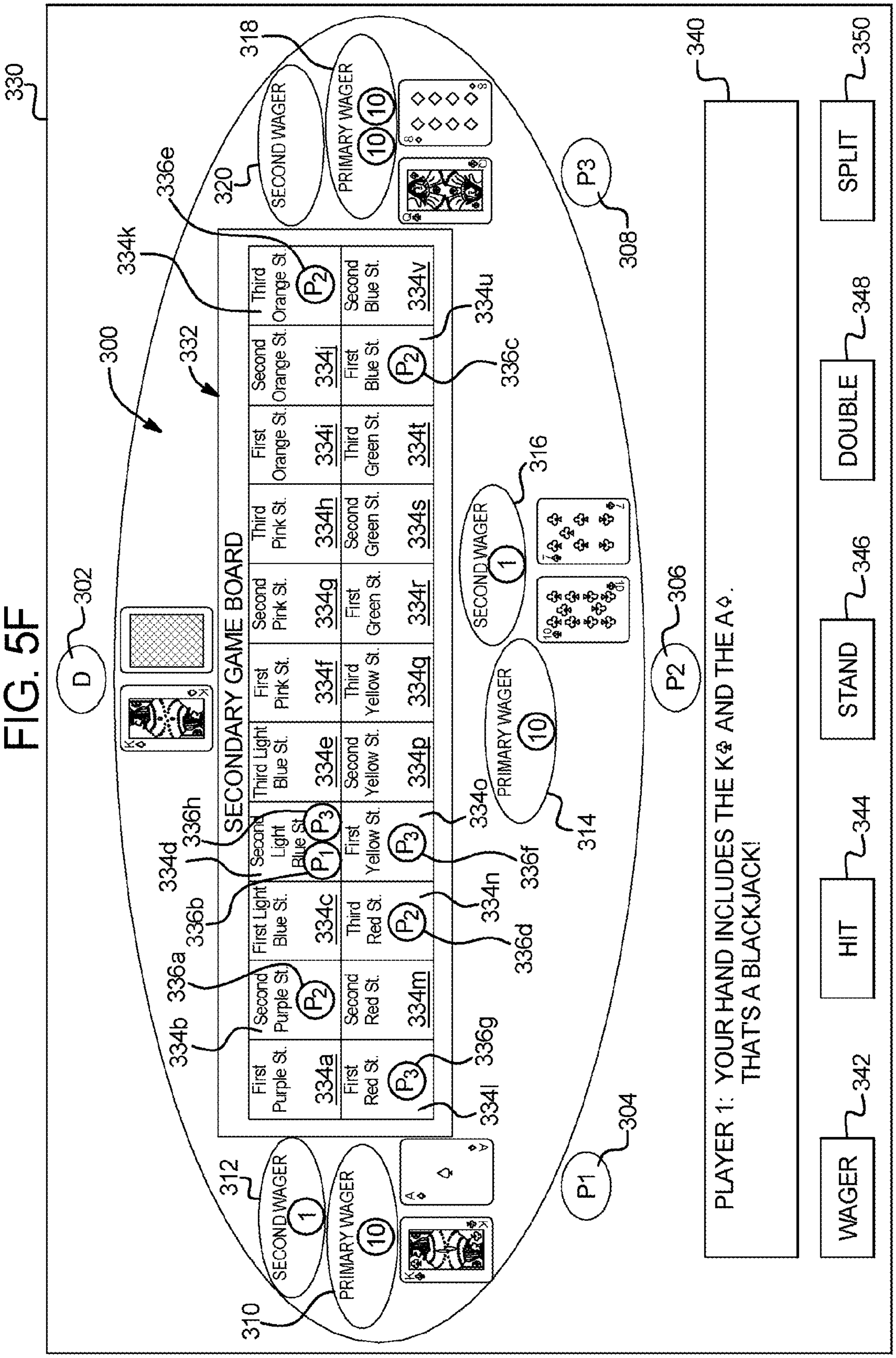

As seen in FIG. 5F, The gaming device causes an initial two-card hand to be dealt to each of the players from the remaining cards in the virtual set of cards. As indicated by the message display 342, Player one's hand 322*a* includes the K♣.and the A♠.which is a blackjack. Player two's hand 322*b* includes the 10♣. and the 7♣. and therefore has a total value of seventeen. Player three's hand 322*c* includes the Q♣. and the J♥, and therefore has a total value of twenty. The dealer hand 324 includes a K♠.and a down-card.

Figure 5G:
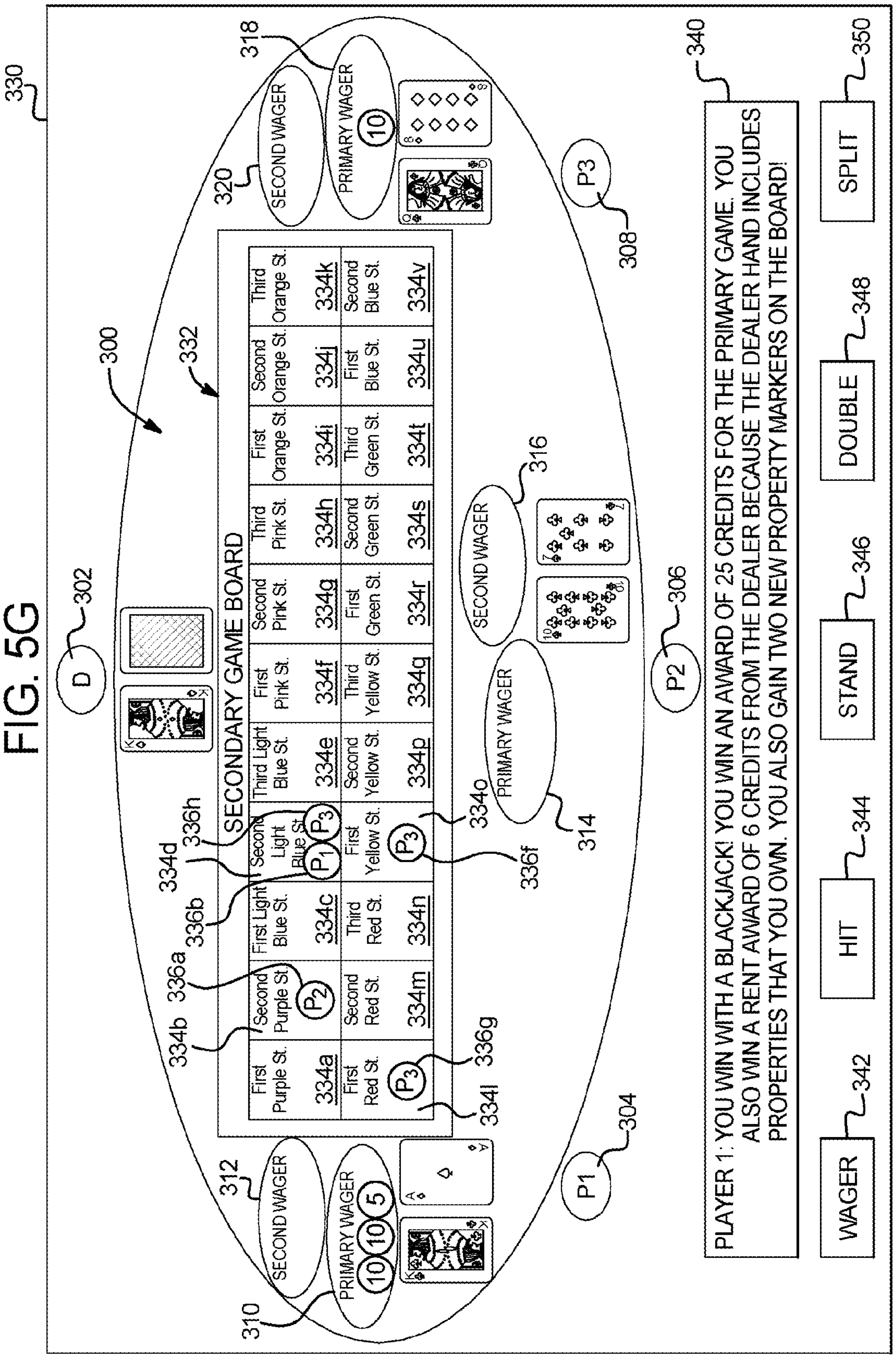

As illustrated in FIG. 5G, the down-card in the dealer hand 324 is revealed. The down-card in the dealer hand 324 is the Q◇, such that the dealer's hand has a total value of twenty.

Accordingly, Player one's hand 322*a*, which is a Blackjack, wins against the dealer hand 324. Player one 304 wins an award of twenty five credits, as indicated by the message in the message display 342.

The dealer hand 324 includes the K♠.and Q◇. Thus, the dealer hand includes Second Purple St. (which is associated with the K♠. card) and Second Light Blue St. (which is associated with the Q◇ card). Player one 304 owns both of these properties, as indicated by markers 336*a* and 336*b* on the secondary game board 332. The dealer must pay Player one 304 rent for these properties. According to the table of FIG. 3A, Second Purple St. and Second Light Blue St. are associated with rent amount of two credits and four credits, respectively. Thus, the player wins an additional six credits in rent from the dealer, as indicated by the message display 342.

Since Player one 304 had a winning hand in the primary Blackjack game, Player one 304 also acquires additional properties on the secondary game board 332. More specifically, Player one's hand 322*a* included the K♣. which is associated with Third Pink St., and the A♠.which is associated with First Purple St. As indicated by the secondary game board 332, two new markers 336*i* and 336*j* for Player one are placed on positions 334*h* and 334*a*, which correspond to Third Pink St. and First Purple St., respectively.

After the second play of the Blackjack game, Player three 308 also has a property marker 336*h* on Second Light Blue St. Thus, the dealer also pays Player three 308 rent for this property. It should be appreciated that, in the illustrated example, Player three 308 and Player one 304 both owned Second Light Blue St. In one embodiment, if two players own the same property, the dealer pays them both the designated rent amount associated with that property, if the dealer has a card in his hand that includes the corresponding secondary property symbol. In other embodiments, players who own the same property share the rent amount equally or divide it among themselves in any suitable manner.

Although Player three's hand 322*c* only tied the dealer's hand 324, Player three 308 still wins an award in the form of rent for Second Light Blue St. In the illustrated embodiment, a player can only gain properties if the player places the optional second wager and obtains a winning outcome in the primary game. Therefore, since Player three only tied in the second play of the Blackjack game and did not win, Player three 308 will not gain any additional properties. However, since Player three 308 did not lose the Blackjack game, his previously accumulated property markers 336*f*, 336*g*, and 336*h* remain on the secondary game board 332.

Player two 306 lost in the Blackjack game because Player two's hand 322*b* had a total value of seventeen, which does not beat the dealer's hand 324. Player two 306 does not win an award in the Blackjack game. Also, even though Player two 306 has three property markers 336*c*, 336*d*, and 336*e* on the secondary game board 332, the dealer's hand 324 does not include any secondary property symbols which correspond to the properties owned by Player two 306. Accordingly, Player two 306 does not win any secondary awards in the form of rent. Finally, since Player two 306 lost the primary Blackjack game, all of Player two's property markers are cleared from the board, as indicated by the "X" symbols on Player two's property markers 336*c*, 336*d*, and 336*e*.

It should be appreciated that, even though Player two 306 lost in the primary Blackjack game, there was still an evaluation of the dealer's hand 324 to determine whether the dealer's hand 324 includes any secondary property symbols which correspond to properties owned by Player two 306.

The above example illustrates how placing the optional second wagers gives players the opportunity to win additional secondary awards in subsequent plays of the Blackjack game. It should be appreciated that, in the illustrated example, the players do not collect rents from each other. Rather, only the dealer pays rents to the players. In other embodiments, the secondary game includes an element of competition, wherein players collect rent from each other, in addition to or instead of from the dealer.

In one alternative embodiment, rather than providing secondary awards to a player when the dealer's hand includes secondary symbols that match properties owned by that player, the player participates in a separate secondary game or event upon a suitable triggering event.

In one such embodiment, the primary game includes a Blackjack game. Each time a player obtains a designated outcome, such as a winning outcome, in the Blackjack game, the player collects or accumulates one or more properties on a secondary game board, if the player placed the optional second wager. When the secondary game is triggered, the player has a game piece which moves on or around the secondary game board in an attempt to accumulate secondary awards.

In various embodiments, the triggering event which initiates the secondary game is based on a primary game outcome, such as: (i) a player blackjack; (ii) a player win; (iii) a dealer blackjack; (iv) a dealer win; (v) a player-dealer tie; (vi) a player accumulating a designated number of wins; (vii) a player accumulating a designated number of losses; (viii) an amount of time elapsing; or (ix) any other suitable outcome. Alternatively, the triggering event could be based upon completion of certain events, such as obtaining a designated number of properties on the board, obtaining a certain number of different groups or families of properties on the board, obtaining a certain number of upgrades on the board, etc.

In one embodiment, when the secondary game is triggered, the player is provided with a number of dice rolls to go around the secondary game board. In various embodiments, the provided number of dice rolls may be predetermined, randomly determined, based on wager level, based on player tracking, determined based on the triggering event that triggered the secondary game, or determined in any other suitable manner. In one such embodiment, the player's game piece moves on or around the board based upon the outcome of the dice rolls. It should be appreciated that casinos may implement any suitable rules for moving around the secondary game board. In one example embodiment, MONOPOLY® doubles rules could apply, such that if a dice roll results in doubles (e.g., two threes, two fours, or two fives, etc.), the player gets to roll the dice again. In one embodiment, if the player rolls doubles a designated number of times, such as three times, in a row, the player loses one, some, or all of his properties on the secondary game board.

As the player moves around the board, the player wins awards by landing on various positions of the secondary game board. In one embodiment, if the player lands on a position of the secondary game board that is associated with a property owned by the player, the player wins an award. In other embodiments, the player can win awards for landing on other positions of the secondary game board, but positions associated with properties owned by the player are worth substantially more. In certain multi-player embodiments, when a first player is rolling the dice and moving around the secondary game board, all eligible or participating players who own positions on the secondary game board have the chance to win awards based on which positions the first player (i.e., the first player's game piece) lands on. It should be appreciated that, in such embodiments, although the player is moving around the board, the dealer is providing any rent awards to the players.

In another embodiment, when the secondary game is triggered, the dealer (and not the player) gets a predetermined number of dice rolls to move around the secondary game board. The result of each roll determines how many positions the dealer will move on the secondary game board. The dealer has to pay the player or players rent awards for landing on any of the player's properties. In various different embodiments, the players who are eligible to win rent awards from the dealer, as the dealer moves around the secondary game board, could be: (i) players who currently own property; (ii) players who placed a secondary wager for that play of the game; and/or (iii) players who obtained a certain outcome in the primary game, etc.

In other embodiments, movement around the secondary game board is based on the player and/or dealer hands. For example, in an embodiment where the dealer moves around the secondary game board in the secondary game, if the dealer's hand includes cards that add up to a total value of seventeen, the dealer moves seventeen spaces around the secondary game board. The dealer pays the player any rents for landing on one of the player's properties. As an alternative to using the combined total of the dealer's hand to determine how many positions to move around the secondary game board, the value of the highest card or the value of the dealer's up-card may be used to determine how many moves the dealer will make. In another embodiment, each card of the dealer's hand is used to move the dealer's game piece on the board, so that the dealer moves and stops multiple times, paying out rent awards each time the dealer lands on a player-owned property. For example, if the dealer has a ten and a seven, the dealer first moves ten spaces and lands on a property. The dealer pays a rent award to any players who own that property. Then, the dealer moves seven spaces and lands on another property. The dealer then pays a rent award to any players who own that second property.

In an embodiment where the player moves around the secondary game board, the player's blackjack hand is used to determine how many moves the player will have. In other embodiments, the dealer's hand determines how many moves the player will make, and/or the player's hand determines how many moves the dealer will make.

As discussed above, in certain embodiments, the secondary game board includes one or more non-property positions, such as "Go to Jail" or "Free Parking," etc. If the player lands on a certain one of these non-property positions, such as Go to Jail, then the player loses one, more, or all of his properties. If the player lands on a certain other one of the non-property positions, such as Free Parking, then the player wins a bonus award just for landing on that position.

The above embodiments may be provided in single-player format or in multi-player format. It should be appreciated that the present disclosure can incorporate any suitable type of primary or base game, such as a slot game, a poker game, a keno game, or a bingo game.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of operating a gaming system, said method comprising:

(a) enabling a player to place a wager on a first play of a primary card game;

(b) if the wager is placed on said first play of the primary card game, said first play of the primary card game including a first player hand and a first dealer hand:

(i) causing at least one processor to execute a plurality of instructions stored in at least one memory device to generate a primary card game outcome for said first play of the primary card game, (ii) causing the at least one processor to execute the plurality of instructions to operate with at least one display device to display any primary awards based on the primary card game outcome to the player, (iii) providing any primary awards, (iv) if the player places a separate wager on a secondary game and if the primary card game outcome for said first play of the primary card game includes a designated outcome, causing the at least one processor to execute the plurality of instructions to accumulate a number of secondary game elements associated with the first player hand for use in the secondary game, wherein each of said secondary game elements includes a component generated in the first play of the primary card game, and (v) causing the at least one processor to execute the plurality of instructions to operate with the at least one display device to display any accumulated secondary game elements;

(c) enabling the player to place a wager on a second play of the primary card game; and (d) if the wager is placed on said second play of the primary card game, said second play of the primary card game including a second player hand and a second dealer hand:

(i) causing the at least one processor to execute the plurality of instructions to generate a primary card game outcome for said second play of the primary card game, (ii) causing the at least one processor to execute the plurality of instructions to operate with the at least one display device to display any primary awards based on the primary card game outcome for said second play of the primary card game to the player, (iii) providing any primary awards, (iv) causing the at least one processor to execute the plurality of instructions to generate a secondary game outcome based on a comparison of any secondary game elements associated with the second dealer hand and any secondary game elements accumulated prior to said second play of the primary card game, (v) causing the at least one processor to execute the plurality of instructions to operate with the at least one display device to display any secondary game awards based on the secondary game outcome to the player, and (vi) providing any secondary game awards.

2. The method of claim 1, which includes, for the first play of the primary card game, if the player places the separate wager on the secondary game and if the primary card game outcome includes the designated outcome, causing the at least one processor to execute the plurality of instructions to accumulate and operate with the at least one display device to display the number of secondary game elements associated with the first player hand for use in the secondary game.

3. The method of claim 1, wherein the designated outcome includes a winning outcome.

4. The method of claim 1, wherein the designated outcome includes a losing outcome.

5. The method of claim 1, wherein causing the at least one processor to execute the plurality of instructions to generate the secondary game outcome based on a comparison of any secondary game elements associated with the second dealer hand and any secondary game elements accumulated prior to said second play of the primary card game includes causing the at least one processor to execute the plurality of instructions to determine whether any of the secondary game elements associated with the second dealer hand have a designated relationship to any of the secondary game elements which were accumulated prior to the second play of the primary card game.

6. The method of claim 5, wherein the designated relationship includes matching.

7. The method of claim 1, wherein said primary card game includes a Blackjack game.

8. The method of claim 7, wherein the designated outcome includes one of: (i) the first player hand outranking the first dealer hand; (ii) the first player hand including a Blackjack; (iii) the first player hand tying the first dealer hand; (iv) the first player hand losing to the first dealer hand.

9. The method of claim 7, wherein the Blackjack game is associated with a designated set of cards, said designated set of cards including a plurality of cards, wherein each of said plurality of cards indicates a primary game symbol and a secondary game symbol.

10. The method of claim 9, which includes, for the first play of the primary card game, causing the at least one processor to execute the plurality of instructions to generate the primary card game outcome based on the primary game symbols indicated by the cards of the first dealer hand and the cards of the first player hand.

11. The method of claim 7, wherein each of the secondary game elements associated with the first player hand accumulated in the first play of the primary card game includes one of the secondary game symbols indicated by the cards of the first player hand in said first play of the primary card game.

12. The method of claim 11, wherein causing the at least one processor to execute the plurality of instructions to generate the secondary game outcome based on a comparison of any secondary game elements associated with the second dealer hand and any secondary game elements accumulated prior to said second play of the primary card game includes:

(i) causing the at least one processor to execute the plurality of instructions to evaluate the cards of the second dealer hand for the second play of the primary card game, and (ii) causing the at least one processor to execute the plurality of instructions to determine whether any of the secondary symbols indicated by the cards of the second dealer hand for the second play of the primary card game have a designated relationship to any of the secondary game elements accumulated by the player prior to the second play of the primary card game.

13. The method of claim 12, wherein the designated relationship includes matching.

14. The method of claim 1, which includes causing the at least one processor to execute the plurality of instructions to remove a designated number of any previously accumulated secondary game elements if said second play of the primary card game does not result in the designated outcome.

15. The method of claim 14, wherein the designated number of previously accumulated secondary game elements removed includes one of: (i) all of the previously accumulated secondary game elements; (ii) a predetermined number of the previously accumulated secondary game elements; (iii) a randomly determined number of the previously accumulated secondary game elements; and (iv) a number of the previously accumulated secondary elements based on an order in which the secondary game elements were accumulated.

16. The method of claim 1, which includes causing the at least one processor to execute the plurality of instructions to operate with the at least one display device to display any accumulated secondary game elements on a secondary game board associated with the secondary game.

17. The method of claim 1, which is provided via a data network.

18. The method of claim 17, wherein the data network is an internet.

19. A method of operating a gaming system, said method comprising:

(a) enabling each of a plurality of players to place a wager on a first play of a primary card game;

(b) for each player who places said wager on the first play of the primary card game, the first play of the primary card game including a first dealer hand and a first player hand associated with said player:

(i) causing at least one processor to execute a plurality of instructions stored in at least one memory device to generate a primary card game outcome, (ii) causing the at least one processor to execute the plurality of instructions to operate with at least one display device to display any primary awards based on the primary card game outcome to said player, (iii) providing any primary awards, (iv) if said player places a separate wager on a secondary game and if the primary card game outcome for said first play of the primary card game includes a designated outcome, causing the at least one processor to execute the plurality of instructions to accumulate a number of secondary game elements associated with said first player hand for use in the secondary game, wherein each of said secondary game elements includes a component generated in the first play of the primary card game, and (iv) causing the at least one processor to execute the plurality of instructions to operate with at least one display device to display any accumulated secondary game elements;

(c) enabling each of the plurality of players to place a wager on a second play of the primary game; and (d) for each player who places said wager on the second play of the primary card game, the second play of the primary card game including a second dealer hand and a second player hand associated with said player:

(i) causing the at least one processor to execute the plurality of instructions to generate a primary card game outcome for said second play of the primary card game, (ii) causing the at least one processor to execute the plurality of instructions to operate with the at least one display device to display any primary awards based on the primary card game outcome to said player, (iii) providing any primary awards;

(iv) causing the at least one processor to execute the plurality of instructions to generate a secondary game outcome based on a comparison of any secondary game elements associated with the second dealer hand and any secondary game elements accumulated by said player prior to said second play of the primary card game, (v) causing the at least one processor to execute the plurality of instructions to operate with the at least one display device to display any secondary game awards based on the determined secondary game outcome to said player, and (vi) providing any secondary game awards.

20. A method of operating a gaming system, said method comprising:

(a) enabling a first player to place a wager on a first play of a primary card game;

(b) if the wager is placed on said first play of the primary card game, said first play of the primary card game including a first first player hand and a first second player hand:

(i) causing at least one processor to execute a plurality of instructions stored in at least one memory device to generate a primary card game outcome for said first play of the primary card game, (ii) causing the at least one processor to execute the plurality of instructions to operate with at least one display device to display any primary awards based on the primary card game outcome to the first player, (iii) providing any primary awards, (iv) if the first player places a separate wager on a secondary game and if the primary card game outcome for said first play of the primary card game includes a designated outcome, causing the at least one processor to execute the plurality of instructions to accumulate a number of secondary game elements associated with the first first player hand for use in the secondary game, wherein each of said secondary game elements includes a component generated in the first play of the primary card game, and (v) causing the at least one processor to execute the plurality of instructions to operate with the at least one display device to display any accumulated secondary game elements;

(c) enabling the first player to place a wager on a second play of the primary card game; and (d) if the wager is placed on said second play of the primary card game, said second play of the primary card game including a second first player hand and a second second player hand:

(i) causing the at least one processor to execute the plurality of instructions to generate a primary card game outcome for said second play of the primary card game, (ii) causing the at least one processor to execute the plurality of instructions to operate with the at least one display device to display any primary awards based on the primary card game outcome for said second play of the primary card game to the first player, (iii) providing any primary awards, (iv) causing the at least one processor to execute the plurality of instructions to generate a secondary game outcome based on a comparison of any secondary game elements associated with the second second player hand and any secondary game elements accumulated prior to said second play of the primary card game, (v) causing the at least one processor to execute the plurality of instructions to operate with the at least one display device to display any secondary game awards based on the secondary game outcome to the first player, and (vi) providing any secondary game awards.

21. The method of claim 20, which includes, for the first play of the primary card game, if the first player places the separate wager on the secondary game and if the primary card game outcome includes the designated outcome, causing the at least one processor to execute the plurality of instructions to accumulate and operate with the at least one display device to display the number of secondary game elements associated with the first first player hand for use in the secondary game.

22. The method of claim 20, wherein the designated outcome includes a winning outcome.

23. The method of claim 20, wherein the designated outcome includes a losing outcome.

24. The method of claim 20, wherein causing the at least one processor to execute the plurality of instructions to generate the secondary game outcome based on a comparison of any secondary game elements associated with the second second player hand and any secondary game elements accumulated prior to said second play of the primary card game includes causing the at least one processor to execute the plurality of instructions to determine whether any of the secondary game elements associated with the second second player hand have a designated relationship to any of the secondary game elements which were accumulated prior to the second play of the primary card game.

25. The method of claim 24, wherein the designated relationship includes matching.

26. The method of claim 20, wherein said primary card game includes a Blackjack game.

27. The method of claim 26, wherein the designated outcome includes one of: (i) the first first player hand outranking the first second player hand; (ii) the first first player hand including a Blackjack; (iii) the first first player hand tying the first second player hand; (iv) the first first player hand losing to the first second player hand.

28. The method of claim 26, wherein the Blackjack game is associated with a designated set of cards, said designated set of cards including a plurality of cards, wherein each of said plurality of cards indicates a primary game symbol and a secondary game symbol.

29. The method of claim 28, which includes, for the first play of the primary card game, causing the at least one processor to execute the plurality of instructions to generate the primary card game outcome based on the primary game symbols indicated by the cards of the first first player hand and the cards of the first second player hand.

30. The method of claim 28, wherein each of the secondary game elements associated with the first first player hand accumulated in the first play of the primary card game includes one of the secondary game symbols indicated by the cards of the first first player hand in said first play of the primary card game.

31. The method of claim 30, wherein causing the at least one processor to execute the plurality of instructions to generate the secondary game outcome based on a comparison of any secondary game elements associated with the second second player hand and any secondary game elements accumulated prior to said second play of the primary card game includes:

causing the at least one processor to execute the plurality of instructions to evaluate the cards of the second second player hand for the second play of the primary card game, and (ii) causing the at least one processor to execute the plurality of instructions to determine whether any of the secondary symbols indicated by the cards of the second second player hand for the second play of the primary card game have a designated relationship to any of the secondary game elements accumulated by the first player prior to the second play of the primary card game.

32. The method of claim 31, wherein the designated relationship includes matching.

33. The method of claim 20, which includes causing the at least one processor to execute the plurality of instructions to remove a designated number of any previously accumulated secondary game elements if said second play of the primary card game does not result in the designated outcome.

34. The method of claim 33, wherein the designated number of previously accumulated secondary game elements removed includes one of: (i) all of the previously accumulated secondary game elements; (ii) a predetermined number of the previously accumulated secondary game elements; (iii) a randomly determined number of the previously accumulated secondary game elements; and (iv) a number of the previously accumulated secondary elements based on an order in which the secondary game elements were accumulated.

35. The method of claim 20, which includes causing the at least one processor to execute the plurality of instructions to operate with the at least one display device to display any accumulated secondary game elements on a secondary game board associated with the secondary game.

36. The method of claim 20, which is provided via a data network.

37. The method of claim 36, wherein the data network is an internet.

38. A method of operating a gaming system, said method comprising:

(a) enabling each of a plurality of players to place a wager on a first play of a primary card game;

(b) for each player who places said wager on the first play of the primary card game, the first play of the primary card game including a first player hand associated with said player and a first second player hand associated with another one of the players:

(i) causing at least one processor to execute a plurality of instructions stored in at least one memory device to generate a primary card game outcome, (ii) causing the at least one processor to execute the plurality of instructions to operate with at least one display device to display any primary awards based on the primary card game outcome to said player, (iii) providing any primary awards, (iv) if said player places a separate wager on a secondary game and if the primary card game outcome for said first play of the primary card game includes a designated outcome, causing the at least one processor to execute the plurality of instructions to accumulate a number of secondary game elements associated with said first player hand for use in the secondary game, wherein each of said secondary game elements includes a component generated in the first play of the primary card game, and (iv) causing the at least one processor to execute the plurality of instructions to operate with at least one display device to display any accumulated secondary game elements;

(c) enabling each of the plurality of players to place a wager on a second play of the primary game; and (d) for each player who places said wager on the second play of the primary card game, the second play of the primary card game including a second player hand associated with said player and a second second player hand associated with the other one of the players:

(i) causing the at least one processor to execute the plurality of instructions to generate a primary card game outcome for said second play of the primary card game, (ii) causing the at least one processor to execute the plurality of instructions to operate with the at least one display device to display any primary awards based on the primary card game outcome to said player, (iii) providing any primary awards;

(iv) causing the at least one processor to execute the plurality of instructions to generate a secondary game outcome based on a comparison of any secondary game elements associated with the second second player hand and any secondary game elements accumulated by said player prior to said second play of the primary card game, (v) causing the at least one processor to execute the plurality of instructions to operate with the at least one display device to display any secondary game awards based on the determined secondary game outcome to said player, and (vi) providing any secondary game awards.

* * * * *